US008582137B2

(12) United States Patent
Yoshimura et al.

(10) Patent No.: US 8,582,137 B2
(45) Date of Patent: Nov. 12, 2013

(54) METHOD AND SYSTEM FOR MANAGING SECURITY OF A REMOTE DEVICE USING A MULTIFUNCTION PERIPHERAL

(75) Inventors: Tomonari Yoshimura, Kyoto (JP); Atsushi Ohshima, Amagasaki (JP); Masami Yamada, Osaka (JP); Masakazu Murakami, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 803 days.

(21) Appl. No.: 12/635,858

(22) Filed: Dec. 11, 2009

(65) Prior Publication Data

US 2010/0157347 A1 Jun. 24, 2010

(30) Foreign Application Priority Data

Dec. 12, 2008 (JP) ................................. 2008-317147

(51) Int. Cl.
*G06K 15/00* (2006.01)
(52) U.S. Cl.
USPC .......... 358/1.14; 358/1.13; 358/1.15; 726/17; 726/18; 726/27; 726/28; 726/35
(58) Field of Classification Search
USPC ............................... 358/1.13–1.15; 726/1–36
See application file for complete search history.

(56) References Cited

U.S. PATENT DOCUMENTS 7,343,627 B2 * 3/2008 Gaebel et al. .................... 726/27
7,523,484 B2 * 4/2009 Lum et al. ......................... 726/1
(Continued)

FOREIGN PATENT DOCUMENTS

JP        6-350784 A    12/1994
JP     11-119927 A     4/1999
(Continued)

OTHER PUBLICATIONS

Office Action (Notification of Reasons for Refusal) dated Dec. 8, 2010, issued in the corresponding Japanese Patent Application No. 2008-317147, and an English Translation thereof.

*Primary Examiner* — Twyler Haskins
*Assistant Examiner* — Dennis Dicker
(74) *Attorney, Agent, or Firm* — Buchanan Ingersoll & Rooney PC

(57) ABSTRACT

A multifunction peripheral that can set appropriate criteria of security levels for another device, and improves usability while lowering a risk of data alteration, information leakage and the like by including a holding part 11 holding therein security criteria set for the image processing functions in one-to-one correspondence; a receiver 12 that receives, from an external terminal, a request for an access that is necessary for executing at least one of the image processing functions; an acquisition part 13 that acquires, from the external terminal, security information that is a security indicator regarding the access from the external terminal; a judgment part 15 that judges whether or not one of the security criteria set for the at least one of the image processing functions is met, based on the acquired security information; an access controller 16 that permits the access if the judgment part 15 judges affirmatively, and prohibits the access or permit the access with a limitation if the judgment part 15 judges negatively; and an execution part 19 that executes the at least one of the image processing functions, if the access controller permits the access.

23 Claims, 13 Drawing Sheets

(56) References Cited

U.S. PATENT DOCUMENTS

| | | | |
|---|---|---|---|
| 7,558,866 B2 | 7/2009 | Choe et al. | |
| 7,571,481 B2 * | 8/2009 | Shimizu | 726/24 |
| 7,889,369 B2 * | 2/2011 | Yoshida et al. | 358/1.15 |
| 8,081,336 B2 * | 12/2011 | Yoshida et al. | 358/1.15 |
| 8,127,362 B2 * | 2/2012 | Asahara | 726/26 |
| 8,209,740 B1 * | 6/2012 | Kulaga et al. | 726/1 |
| 8,213,028 B2 * | 7/2012 | Ikeda et al. | 358/1.13 |
| 2002/0089693 A1 * | 7/2002 | Maruyama | 358/1.15 |
| 2002/0199116 A1 * | 12/2002 | Hoene et al. | 713/201 |
| 2003/0212709 A1 * | 11/2003 | De Schrijver | 707/104.1 |
| 2005/0183141 A1 * | 8/2005 | Sawada | 726/16 |
| 2006/0085850 A1 | 4/2006 | Mayfield et al. | |
| 2006/0126100 A1 * | 6/2006 | Jung | 358/1.14 |
| 2008/0016239 A1 * | 1/2008 | Miller et al. | 709/234 |
| 2008/0072308 A1 | 3/2008 | Tanaka | |

FOREIGN PATENT DOCUMENTS

| | | |
|---|---|---|
| JP | 11-184692 A | 7/1999 |
| JP | 2004-259060 | 9/2004 |
| JP | 2005-018699 | 1/2005 |
| JP | 2005-182311 | 7/2005 |
| JP | 2005-346183 | 12/2005 |
| JP | 2006-134312 A | 5/2006 |
| JP | 2006-178762 | 7/2006 |
| JP | 2006-191552 A | 7/2006 |
| JP | 2007-272396 | 10/2007 |
| JP | 2008-052325 | 3/2008 |
| JP | 2008-225595 | 9/2008 |

* cited by examiner

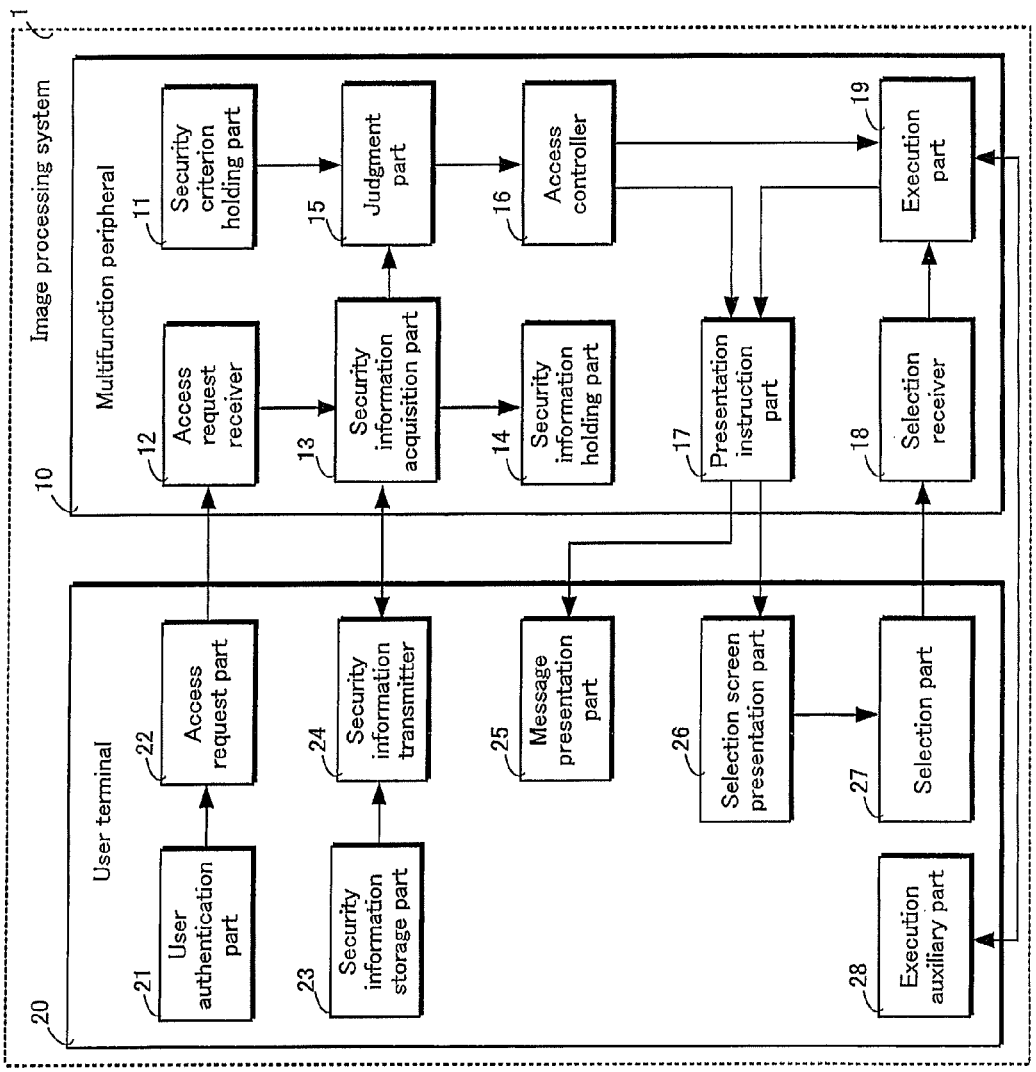

FIG.3

| User name | Function name | Detail of function | Antivirus software | OS | HDD/USB memory encryption | Detection of unapproved software |
|---|---|---|---|---|---|---|
| User A | Print | Use of memory | Not necessary | None | Not necessary | Not necessary |
| | Print | Store on HDD | Up-to-date state | 1.0 or later | Not necessary | Necessary |
| | Scan | Confidential document | Up-to-date state Executed within 1 day No virus detected | 2.0 or later | Necessary | Necessary |
| | Scan | Normal document | Up-to-date state | 1.0 or later | Not necessary | Not necessary |
| | Box | Browse only | Not necessary | None | Not necessary | Not necessary |
| | Box | Confidential box update | Up-to-date state Executed within 7 days | 2.0 or later | Necessary | Necessary |
| | Box | Shared box update | Up-to-date state | 1.1 or later | Not necessary | Not necessary |
| User B | Print | Use of memory | Not necessary | None | Not necessary | Not necessary |
| | Print | Store on HDD | Up-to-date state Executed within 7 days | 1.0 or later | Not necessary | Not necessary |
| | Scan | Confidential document | Up-to-date state Executed within 7 days | 2.0 or later | Necessary | Necessary |
| | Scan | Normal document | Not necessary | 1.1 or later | Necessary | Not necessary |
| | Box | Browse only | Not necessary | None | Not necessary | Not necessary |
| | Box | Confidential box update | Up-to-date state Executed within 1 day No virus detected | 2.0 or later | Necessary | Not necessary |
| | Box | Shared box update | Not necessary | 2.0 or later | Necessary | Not necessary |

FIG.4A

- Since security criterion set for your computer is not met, part of access to multifunction peripheral X is limited.

- Printing of document Y that needs to be stored on HDD (Hard Disk Drive) is not permitted.

- Printing of document Y is permitted in way that document Y is stored in internal memory without being stored on HDD.

FIG.4B

Since security criterion set for your computer is not met, access cannot be made to multifunction peripheral X (printing of document Y is not permitted).

FIG.5A

- Since security criterion set for your computer is not met, part of access to multifunction peripheral X is limited. In order for limitation to be lifted, please implement all of following security measures.

- Update OS to version 2.0 or later
  - Update virus definitions, and re-scan your computer
  - Delete or uninstall unapproved software ZZZ

FIG.5B

Since security criterion set for your computer is not met, part of access to multifunction peripheral X is limited.

Limitation: printing of document Y that needs to be stored on HDD (Hard Disk Drive)

Select one from following.

● Use only internal memory to print document Y without storing it on HDD.

○ Cancel printing of document Y.

Execute

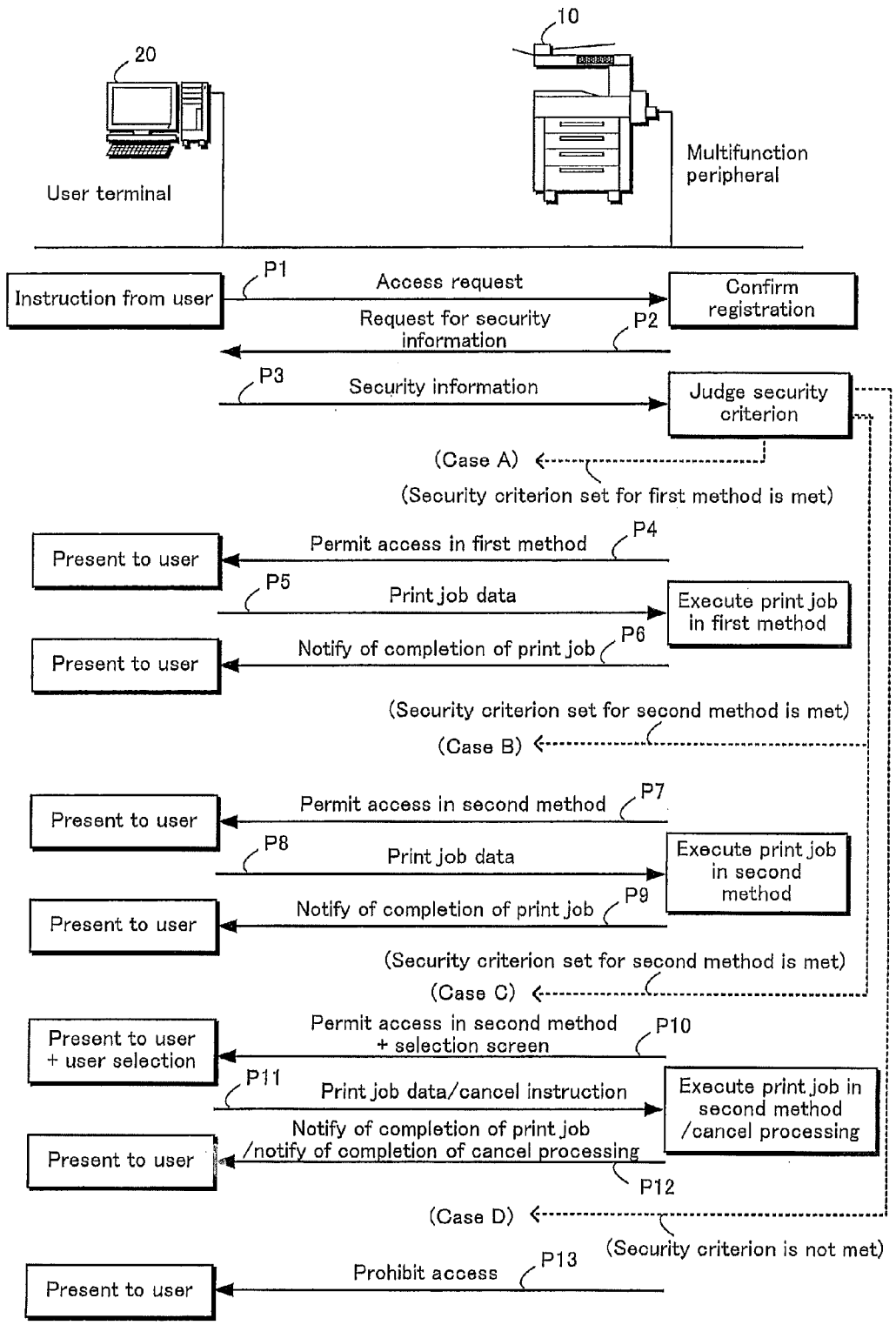

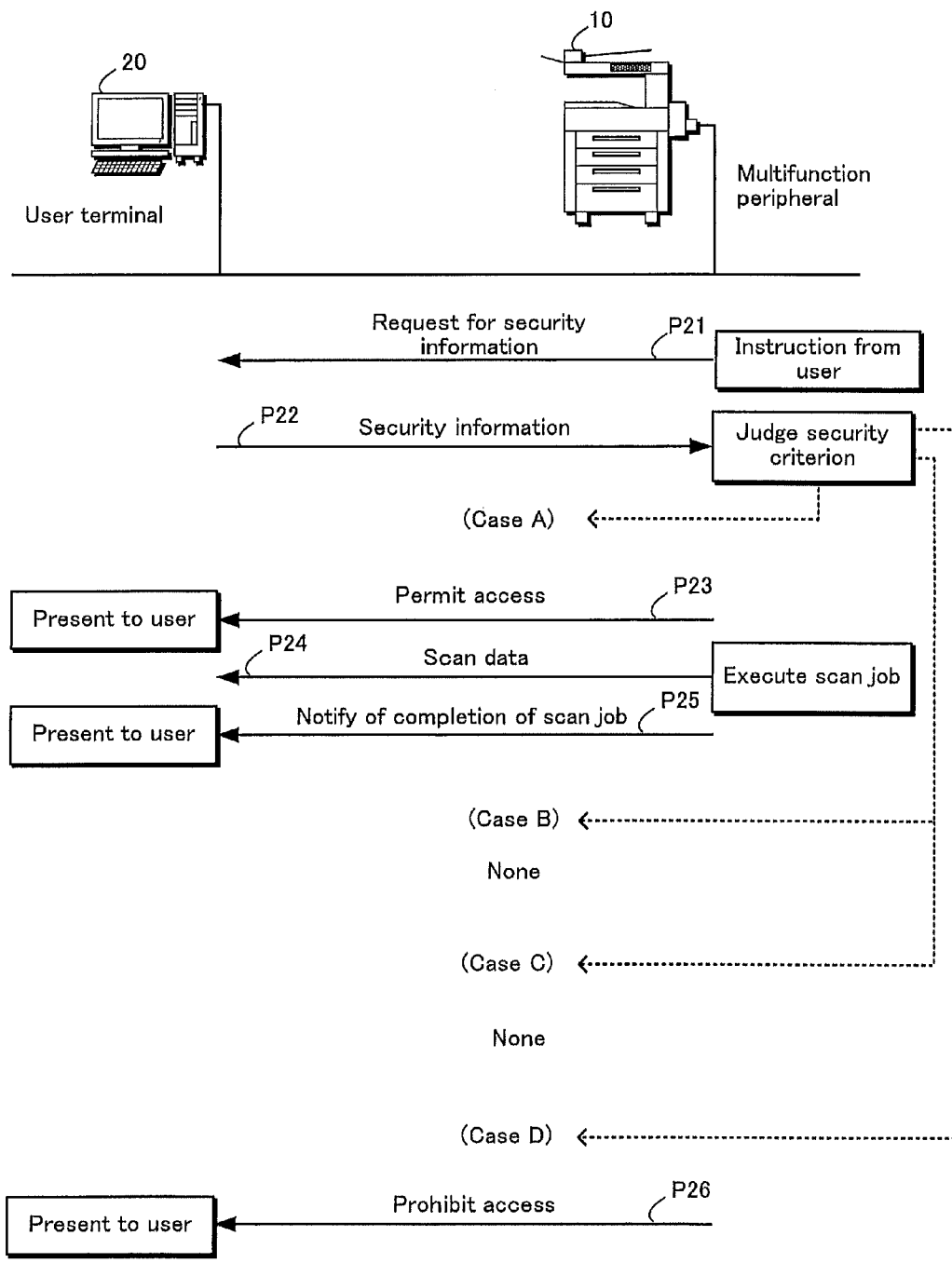

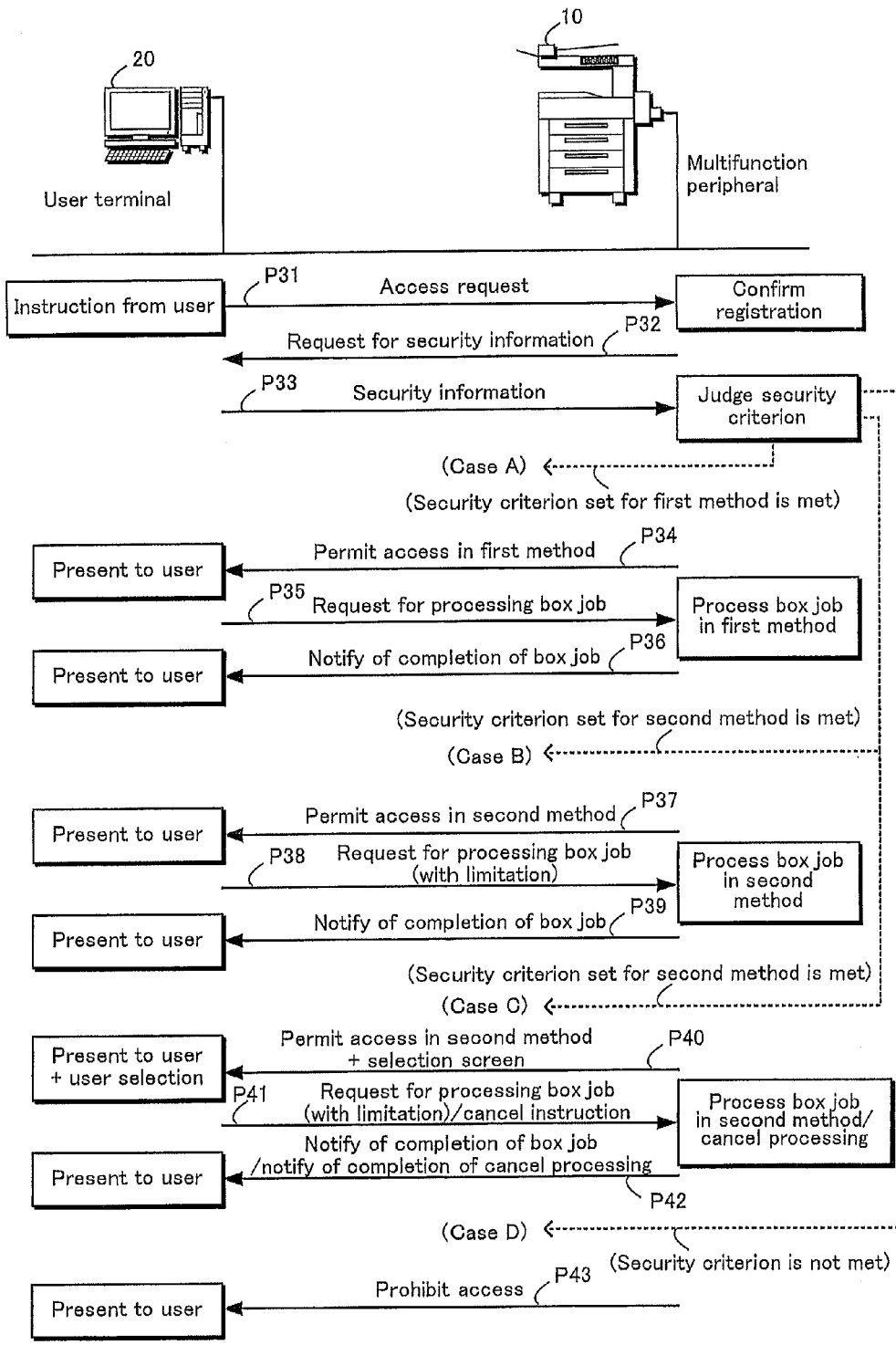

FIG.12A

Warning!
• Since security criterion set for your computer is not met, part of access to multifunction peripheral X is limited.

Limitation 1: Printing that requires storing data on HDD (Hard Disk Drive)
Limitation 2: Printing that uses internal memory without saving data on HDD In order for Limitation 1 to be lifted, please implement all of following security measures.
• Update OS to version 1.0 or later
• Update virus definitions, and re-scan your computer
• Delete or uninstall unapproved software ZZZ In order for Limitation 2 to be lifted, please implement following security measure
• Delete or uninstall unapproved software ZZZ

FIG.12B

Deregistration!
• Since predetermined time has elapsed with security criterion set for your computer left unmet, your computer will be deregistered from multifunction peripheral X

FIG.12C

Deregistration! Disconnection!
• Since predetermined time has elapsed with security criterion set for your computer left unmet, your computer will be unregistered from multifunction peripheral X, and will be forcibly disconnected

METHOD AND SYSTEM FOR MANAGING SECURITY OF A REMOTE DEVICE USING A MULTIFUNCTION PERIPHERAL

This application is based on application No. 2008-317147 filed in Japan, the content of which is hereby incorporated by reference.

BACKGROUND OF THE INVENTION (1) Field of the Invention

The present invention relates to a multifunction peripheral, and relates in particular to a technique for managing security appropriately when receiving, by remote control, a job from another device.

(2) Description of the Related Art

In general, a multifunction peripheral having a plurality of image processing functions including, in addition to an image forming function such as a print function, a scan function, a copy function, and a fax transmission/reception function that has a combination of the above-stated functions and a communication function can receive, by the remote control, various types of jobs from another device such as a PC, and execute the jobs.

Also, some multifunction peripherals include therein hard disk drives (HDDs) for storing therein image data and the like, and have functions of receiving access to the HDDs from another device.

Such multifunction peripherals perform virus check on transmitted and received data so as to avoid getting infected by a computer virus. However, when an external device has security problems (e.g. a version of an OS of the PC or the like to make an access to is out-dated, or an OS, an application, or the like is not appropriately updated), there is a risk that data alteration or information leakage, for example, is caused via the PC or the like.

In view of this, various techniques have been suggested in order to avoid such a risk.

For example, Japanese Patent Application Publication No. 2006-134312 (document 1) discloses a system and a method that do not permit an access from a client to a host computer until the client passes the security check.

Also, Japanese Patent Application Publication No. 2006-191552 (document 2) discloses a system and a method that do not respond to an access request until a server authorizes a client in a dynamic configuration process.

Also, Japanese Patent Application Publication No. H11-184692 (document 3) discloses a communication apparatus that converts electric mail data into fax data, and transmits the fax data via fax if it is judged that the electrical mail data or the communication apparatus is infected by a virus.

Also, Japanese Patent Application Publication No. H11-119927 (document 4) discloses a printer apparatus that detects a virus included in an inputted program language, processes data for printing with use of a program language confirmed to have no virus, and detect the virus with use of the program language confirmed to have no virus.

Also, Japanese Patent Application Publication No. H06-350784 (document 5) discloses a fax device that checks whether a file is infected by a computer virus, and, if the file is infected by the computer virus, deletes the file or notifies a user of the infection.

In view of the above, the document 1 and the document 2 seem to disclose the most secure systems and methods since any access from PCs whose security levels are equal to or lower than the criteria is prohibited. However, each of the plurality of functions included in the multifunction peripheral actually has a different risk level or characteristics. Therefore, depending on the setting of the criteria, too strict limitations are put on some functions, while loose limitations are put on other function. This makes it extremely difficult to set the appropriate criteria. For example, when the criterion is set according to a function having the highest risk level, it is secure for sure, but a function that does not have to be limited cannot be used. This extremely lowers usability.

Also, the document 3, the document 4 and the document 5 relate to antivirus measures for the own multifunction peripheral, and are not structured in view of security levels of the PC or the like to make an access to.

SUMMARY OF THE INVENTION

The present invention has an objective to provide: a multifunction peripheral that is capable of setting appropriate criteria of security levels for another device such as the PC, and thus improving usability while lowering a risk of the data alteration, the information leakage and the like; a control method for the multifunction peripheral; and a recording medium recording thereon a control program for the multifunction peripheral that executes the control.

In order to achieve the above-stated objective, the multifunction peripheral of the present invention is a multifunction peripheral having a plurality of image processing functions including an image forming function, the multifunction peripheral comprising: a holding part holding therein security criteria set for the image processing functions in one-to-one correspondence; a receiver operable to receive, from an external terminal, a request for an access that is necessary for executing at least one of the image processing functions; an acquisition part operable to acquire, from the external terminal, security information that is a security indicator regarding the access from the external terminal; a judgment part operable to judge whether or not one of the security criteria set for the at least one of the image processing functions is met, based on the acquired security information; an access controller operable, if the judgment part judges affirmatively, to permit the access, and if the judgment part judges negatively, to prohibit the access or permit the access with a limitation; and an execution part operable to execute the at least one of the image processing functions, if the access controller permits the access.

In order to achieve the above-stated objective, a control method of a multifunction peripheral having a plurality of image processing functions including a image forming function, the multifunction peripheral including a holding part holding therein security criteria set for the image processing functions in one-to-one correspondence, the control method comprising steps of: a reception step of receiving, from an external terminal, a request for an access that is necessary for executing at least one of the image processing functions; an acquisition step of acquiring, from the external terminal, security information that is a security indicator regarding the access from the external terminal; a judgment step of judging whether or not one of the security criteria set for the at least one of the image processing functions is met, based on the acquired security information; an access control step of permitting the access if the judgment step judges affirmatively, and prohibiting the access or permitting the access with a limitation if the judgment step judges negatively; and an execution step executing the at least one of the image processing functions, if the access control step permits the access.

In order to achieve the above-stated objective, a recording medium on which a control program of a multifunction peripheral having a plurality of image processing functions including a image forming function, the multifunction peripheral including a holding part holding therein security criteria set for the image processing functions in one-to-one correspondence, the control program causing the multifunction peripheral to perform processing of: an acquisition step of acquiring, from the external terminal, security information that is a security indicator regarding the access from the external terminal; a judgment step of judging whether or not one of the security criteria set for the at least one of the image processing functions is met, based on the acquired security information; an access control step of permitting the access if the judgment step judges affirmatively, and prohibiting the access or permitting the access with a limitation if the judgment step judges negatively; and an execution step executing the at least one of the image processing functions, if the access control step permits the access.

With such a structure, it is possible to set a criterion of security level separately for each function, for the external terminal. Therefore, an appropriate criterion can be easily set according to a risk level or a characteristic difference of each of the functions.

Therefore, the usability can be improved, while lowering a risk of the data alteration, the information leakage and the like.

The acquired security information may include at least one of: a version of an OS of the external terminal; whether or not a patch is applied to the external terminal; and a latest update date of the OS of the external terminal, each of the security criteria may include at least one of: a required version of an OS; a required patch; and a longest permissible time period from a date of a last update to a date of an execution of a corresponding one of the image processing functions, and the judgment part may judge at least one of: whether or not the version of the OS of the external terminal is the required version of the OS; whether or not the required patch is applied to the external terminal; and whether or not the longest permissible time period has elapsed since the latest update date.

Thus, it is possible to judge, for each function, whether updating of the OS is appropriately performed or not. Therefore, an attack that is performed by an external device via the security hole or the like can be accurately prevented.

The acquired security information may include a result of a virus scan performed on the external terminal, the security criteria include information on a predetermined virus, and if the result of the virus scan indicates that the predetermined virus is detected in the external terminal, the judgment part may judge negatively.

Thus, since a terminal in which a virus is detected cannot make an access to the multifunction peripheral, the multifunction peripheral is comparatively less vulnerable to a virus attack.

The acquired security information may further include a most recent date of the virus scan of the external terminal, the security criteria may include a longest permissible time period from a date of a last virus scan to a date of an execution of a corresponding one of the image processing functions, and the judgment part may judge whether or not the longest permissible time period has elapsed since the most recent date.

Thus, since a due date of the virus scan can be set for each of the functions, the virus attack can be accurately prevented.

The acquired security information may further include whether or not software having a security problem is installed on the external terminal, and if the software having the security problem is installed on the external terminal, the judgment part may judge negatively.

Thus, since a terminal on which software having a security problem such as file-exchange software is installed cannot make an access to the multifunction peripheral, leakage of confidential data, for example, can be prevented.

The acquired security information may include types of software installed on the external terminal, the security criteria may include information on approved software having no security problem, and if the software installed on the external terminal includes unapproved software, the judgment part may judge negatively.

Thus, a terminal on which unapproved software that possibly has a security problem is installed cannot make an access to the multifunction peripheral, the leakage of the confidential data, for example, can be prevented.

The acquired security information may include whether or not a storage medium that stores therein data that has not been encrypted is mounted on the external terminal, and when the storage medium is mounted on the external terminal, the judgment part may judge negatively.

Thus, since a terminal with which a recording medium storing thereon unencrypted data is mounted cannot make an access to the multifunction peripheral, the leakage of the confidential data or the like can be prevented.

The multifunction peripheral may further comprise a hard disk drive, wherein one or more of the security criteria set for corresponding one or more of the image processing functions that requires an access to the hard disk drive may be stricter than one or more of the security criteria set for corresponding one or more of the image processing functions that do not require the access to the hard disk drive.

Thus, since a security criterion set for any function that requires an access to the hard disk drive is stricter, the leakage of the confidential data, for example, can be prevented for each function.

One or more of the image processing functions may be selectively executed in one of: a first method that accesses the hard disk drive; and a second method that does not access the hard disk drive, the security criteria may include a security criterion that is set individually for each of the first method and the second method, the security criterion set for the first method being stricter than the security criterion set for the second method, the judgment part may further judge the one or more of the image processing functions to obtain one of results as follows: a first result in which the security criterion set for the first method is met; a second result in which the security criterion set for the first method is not met, and the security criterion set for the second method is met; and a third result in which neither the security criterion set for the first method nor the security criterion set for the second method are met, and the access controller may: permit a first access that is necessary for executing the one or more of the image processing functions in the first method if the judgment part obtains the first result; permit a second access that is necessary for executing the one or more of the image processing functions in the second method if the judgment part obtains the second result; and prohibit any access that is necessary for executing the one or more of the image processing functions if the judgment part obtains the third result.

Thus, even if the security criterion set for some function is not met, the execution of the function in a method that does not make an access to the hard disk drive can be permitted. Therefore, the usability can be improved without increasing a risk of the data alteration caused in the hard disk drive, the information leakage and the like.

The execution part may execute the one or more of the image processing functions in the first method if the access controller permits the first access, and execute the one or more of the image processing functions in the second method if the access controller permits the second access.

Thus, when the security criterion set for some function is not sufficiently met, the function is automatically executed in the second method. Therefore, the usability can be improved.

The multifunction peripheral may further include a presentation instruction part operable, if the access controller permits the second access, to instruct the external terminal to present a message that the first access is limited, and the second access is permitted; and if the access controller prohibits any access that is necessary for executing the one or more of the image processing functions, to instruct the external terminal to present a message that any access that is necessary for executing the one or more of the image processing functions is prohibited.

Thus, when a security problem arises and the access is limited or prohibited, the message can be presented. Therefore, it is easy to deal with the problem.

If the access controller permits the second access, the presentation instruction part may further instruct the external terminal to present a factor that has caused the limitation of the first access, and to present a selection screen that encourages a user to select between execution processing that executes the one or more of the image processing functions in the second method, and cancel processing that cancels an execution of the one or more of the image processing functions, and the execution part may receive, from the external terminal, the selection made by the user, and execute the one or more of the image processing functions if the user selects the execution processing.

Thus, it is possible to allow the user to select an execution method by presenting a factor that has caused the limitation of the access. Therefore, the user can make a selection as to whether to execute the function in the second method, or to cancel the execution once, and re-try to execute the function after eliminating the factor, for example. Therefore, the usability can be improved.

The acquisition part may regularly acquire pieces of security information from external terminals regardless of whether the request for the access is received by the receiver, the external terminals including an external terminal that are expected to be accessed in a future and a currently connected external terminal, wherein the multifunction peripheral may further comprise: a security information holding part holding therein each piece of the security information for a corresponding one of the external terminals; and a warning part operable to: compare, for each of the external terminals, a newly acquired piece of the security information with a previously acquired piece of the security information held in the security information holding part; and if the newly acquired piece of the security information includes one or more changed items that have security problems, to instruct a corresponding one of the external terminals to present a warning message that notifies of the changed items.

Thus, the security information is regularly acquired, and the warning message can be displayed when the security problem occurs due to the changed item included in the security information. Therefore, the external device can be kept in secure condition. Also, there will be fewer cases where the user is bothered because it takes a while to deal with the problem in executing the job.

The multifunction peripheral may further comprise a deregister operable, if a predetermined time period has elapsed with the security problems unsolved on the corresponding one of the external terminals that is caused to present the warning message, to exclude the corresponding one of the external terminals from a target that is expected to be accessed in the future, and to disconnect the corresponding one of the external terminals if the corresponding one of the external terminals is currently connected.

Thus, an external terminal having a security problem left unsolved for a certain time period can be deregistered or disconnected. The currently connected external terminal can be disconnected from the multifunction peripheral. Therefore, a security level can be managed for each external terminal even if the job is not executed.

The acquisition part may be further operable to acquire identification information that specifies each user or each user group, the holding part may further hold therein the security criteria for each of the users or each of the user groups, and the judgment part may make the judgment for each of the users or each of the user groups.

Thus, since whether or not the security criterion is met can be judged for each user or each user group, the usability can be improved for each user.

The access controller may limit the access at a network module level when permitting the access with the limitation.

Thus, since the access can be limited at the network module level, an illegal access can be prevented, and a trouble such as a bug due to a certain combination of a function or a program with a port can be comparatively easily prevented.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings:

FIG. 2 shows an outline of a basic functional structure of an multifunction peripheral 10 and a user terminal 20 described in the first embodiment;

FIG. 3 shows an example of a security criterion table held in a security criterion holding part 11;

FIG. 4A shows an example of a message shown by a message presentation part 25 when an access necessary for executing a corresponding function in a first method is limited, and an access necessary for executing the function in a second method is permitted, and FIG. 4B shows an example of a message shown by the message presentation part 25 when any access necessary for executing the function is prohibited;

FIG. 5A shows an example of a message presented by a selection screen presentation part 26 showing a factor that causes the limitation of the access necessary for executing the function in a first method, and FIG. 5B shows an example of a selection screen shown by the selection screen presentation part 26;

FIG. 6 shows an outline of operation and information flow for a print job;

FIG. 7 shows an outline of operation and information flow for a scan job;

FIG. 8 shows an outline of operation and information flow for a box job;

FIG. 12A shows an example of a warning message shown by a message presentation part 55, FIG. 12B shows an example of the deregistration message shown by the message presentation part 55, and FIG. 12C shows an example of a disconnection message shown by the message presentation part 55.

DESCRIPTION OF THE PREFERRED EMBODIMENT

The First Embodiment

<Outline>

According to a first embodiment, with the multifunction peripheral that receives various types of image processing jobs from another device by remote control and executes the jobs: a security criterion can be set for each image processing function according to a corresponding risk level; a plurality of methods having different security criteria can be provided for one image processing job; and these methods can be selectively adopted according to the state of the external terminal.

<Structure>

Figure 1:
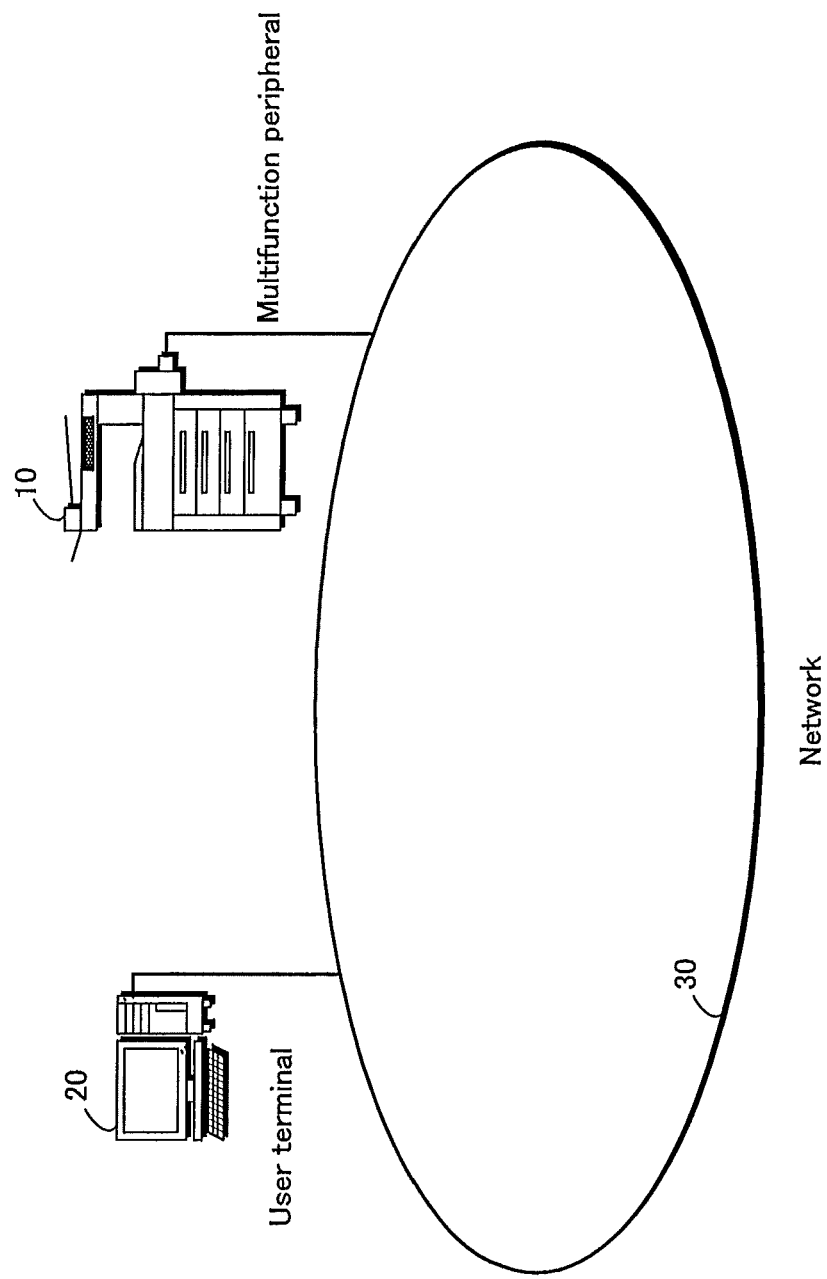
FIG. 1 shows an outline of the image processing system described in a first embodiment.

FIG. 1 shows an outline of an image processing system described in the first embodiment.

An image processing system 1 according to the first embodiment is composed of a multifunction peripheral 10 and a user terminal 20 that are connected and can be communicate with one another through a network 30.

The multifunction peripheral 10 has a plurality of image processing functions including, a network printing function, a scanner function, a fax function and a document server function, in addition to image forming functions such as a print function and a copy function. Each of the functions may be executed individually, or may be executed in combination with other functions. For example, the multifunction peripheral may print (copy) a document read by a scanner while sending the document via fax.

The user terminal 20 is a computer that is capable of causing, by remote control from an external device, the multifunction peripheral 10 to execute various types of jobs.

Although the only one multifunction peripheral and one user terminal are provided in order to simplify the description, a plurality of multifunction peripherals and user terminals may be provided.

FIG. 2 shows an outline of a basic functional structure of each of the multifunction peripheral 10 and the user terminal 20 described in the present embodiment.

As shown in FIG. 2, the multifunction peripheral 10 includes a security criterion holding part 11, an access request receiver 12, a security information acquisition part 13, a security information holding part 14, a judgment part 15, an access controller 16, a presentation instruction part 17, a selection receiver 18 and an execution part 19. The user terminal 20 includes a user authentication part 21, an access request part 22, a security information storage part 23, a security information transmitter 24, a message presentation part 25, a selection screen presentation part 26, a selection part 27 and an execution auxiliary part 28.

The security criterion holding part 11 holds therein a security criterion table showing security criteria for the user terminal 20 that are set for each of the functions.

FIG. 3 shows an example of the security criterion table held in the security criterion holding part 11. In FIG. 3, items in a "User name" column each indicate a name of a user or a name of a user group such as a division to which the user belongs, or an identifier thereof. The security criterion is set for each user or each user group. Also, in FIG. 3, items in a "Function name" column each indicate a name of a function that is allowed for the corresponding user name to execute. Since there are a plurality of functions having the same function name but different security levels, items in a "Detail of function" column each mainly indicate a difference among the plurality of functions and a characteristic of each of the plurality of functions shown in FIG. 3. Also, in FIG. 3, items in an "Antivirus software" column each indicate a state of antivirus software necessary for executing each function. For example, one or more of the followings are specified: whether or not checking on the antivirus software is necessary, whether or not the antivirus software is kept up-to-date, a longest permissible time period from a date of a last update of the antivirus software to a date of an execution of the function, a longest permissible time period from a date of a last virus scan to a date of an execution of the function, a result of the virus scan, whether or not checking on detection of a predetermined virus is necessary, or a specific product name or a specific identifier number of commercial antivirus software. Also, a list of predetermined viruses is separately stored. Also, since the OS is not protected against a security hole or the like when the OS is old or an important patch is not applied to the OS in some cases, items in an "OS" column each indicate whether an OS is up-to-date or outdated in FIG. 3. For example, one or more of the followings are specified in the items in the "OS" column: whether or not checking on a version of the OS is required; a required version number of an OS; a required patch identifier; whether or not it is necessary to see if the OS is kept up-to-date, and a longest permissible time period from a date of a last update to a date of an execution of the function. Also, in FIG. 3, items in a "HDD/USB memory encryption" column each indicate whether or not checking of whether or not it is necessary to see if data on an HDD and a USB memory need to be encrypted since information recorded on a recording medium such as the HDD or USB memory is at higher risk of leakage when the data is not encrypted. Also, in FIG. 3, items in a "Unapproved software detection" column each indicate whether or not checking of installation of unapproved software is necessary since software such as some types of file exchange software having a high risk of information leakage are distributed. Also, a list of approved software is separately stored.

Also, according to the security criteria held in the security criterion holding part 11, a stricter limitation is set for a function that requires an access to the HDD than a function that does not require an access to the HDD. Those include functions that can be selectively executed either in a first method that accesses the HDD or in a second method that does not access the HDD. According to the above-mentioned function that can be selectively executed, a security criterion is set for each of the first method and the second method separately. The criterion set for the first method is stricter than the criterion set for the second method. To give a concrete example, according to the user A in the table shown in FIG. 3, a print function (Use of memory) in a first row of items corresponds to the second method while a print function (Use of HDD) in a second row of the items correspond to the first method.

The access request receiver 12 receives, from the user terminal 20, a request for an access necessary for executing one of the plurality of functions included in the multifunction peripheral 10. For example, the access request receiver 12 receives requests for an access necessary for executing the print function, the scan function and a box function. In the present embodiment, each of the requests for an access includes a user ID or a user group ID, and a function name for which the access request is made.

Note that the above-mentioned box function is a function of a multifunction peripheral that is capable of storing on and outputting from an internal hard disk, image data that has been scanned at the time of photocopying, received by fax, or just scanned and stored. The user can create a section on the internal hard disk called "box" for any purpose and store data in a specified box. Also, the box function is included in the image processing functions of the multifunction peripheral 10.

The security information acquisition part 13 makes a request to the user terminal 20 for security information that relates to the user terminal 20 and is used as an indicator of security at the time of making an access, and acquires the security information.

In the present embodiment, the security information shows the states of the user terminal 20 that correspond to the respective items included in the security criterion table shown in FIG. 3. Specifically, examples of the states include the specific product name or the specific identification number of antivirus software used on the user terminal 20, whether the antivirus software is kept up-to-date, the number of days that has elapsed since the date of the last update of the antivirus software, an ID of a virus detected in the virus scan, a most recent date of the virus scan, a version number of the OS, an ID of the required patch, whether the OS is kept up-to-date, the number of days elapsed since the latest update of the OS, whether or not data on the HDD is encrypted, whether or not data on the USB memory is encrypted, a product name or identification number of the currently installed software, a latest update date of a password.

The security information holding part 14 holds therein the security information acquired by the security information acquisition part 13.

The judgment part 15 judges whether or not the security criterion, which is held in the security criterion holding part 11 and is set for the function related to the request for the access received by the access request receiver 12, is met based on the security information acquired by the security information acquisition part 13.

Also, the judgment part 15 judges, regarding the function that can be selectively executed, which one of the following three results the function fits into: a first result in which the security criterion set for the first method is met; a second result in which the security criterion set for the first method is not met, and the security criterion set for the second method is met; and a third result in which neither the security criterion set for the first method nor the security criterion set for the second method are met.

In the present embodiment, the judgment part 15 judges the following: whether or not the version of the OS of the user terminal 20 is a required version of an OS; whether or not the required patch is applied to the user terminal 20, whether the longest permissible time period has elapsed since the latest update date of the OS; whether the predetermined virus on the user terminal 20 is detected in the virus scan; whether the longest permissible time period has elapsed since the most recent virus scan; whether or not software having a security problem is installed; whether or not unapproved software is installed on the user terminal 20; whether or not the user terminal 20 is mounted with a recording medium that stores unencrypted data; and whether the update of the password has not been performed for a predetermined time period.

When the judgment part 15 judges that the security criterion set for the function related to the request for the access is met, the access controller 16 permits the access by the user terminal 20 necessary for executing the corresponding function. When the judgment part 15 judges negatively, the access controller 16 basically prohibits the access by the user terminal 20 necessary for executing the corresponding function. Regarding the function that can be selectively executed, the access controller 16 permits the access necessary for executing the corresponding function in the first method if the judgment part 15 obtains the first result as a result of the judgment; the access controller 16 permits the limited access necessary for executing the corresponding function in the second method if the judgment part 15 obtains the second result as a result of the judgment; and the access controller 16 prohibits any access necessary for executing the corresponding function if the judgment part 15 obtains the third result as a result of the judgment.

For example, when the access is necessary for executing the print function, the execution part 19 stores, on the HDD, information and data received from the user terminal 20, and efficiently executes the print job if the judgment part 15 obtains the first result as a result of the judgment. When the judgment part 15 obtains the second result as a result of the judgment, the execution part 19 stores the information and the data in a temporal storage area such as a work area in the memory without storing the information and the data on the HDD, executes the print job and deletes the information and the data immediately upon completion of the execution.

Also, when the access is necessary for executing the scan function, for example, the execution part 19 stores the scanned data on the HDD, and transmits the scanned data to the user terminal 20 if the judgment part 15 obtains the first result as a result of the judgment. If the judgment part 15 obtains the second result, the execution part 19 just stores the scanned data on the HDD, and does not transmit the scanned data to the user terminal 20 until the judgment part 15 judges that the security criterion set for the scan function is met.

Also, when the access is necessary for executing the box function, for example, the access controller 16 permits a connection with each of a port for browsing, a port for storing, a port for updating and a port for downloading if the judgment part 15 obtains the first result as a result of the judgment. If the judgment part 15 obtains the second result as a result of the judgment, the access controller 16 permits a connection only with the port for browsing.

Note that if the judgment part 15 obtains the second result as a result of the judgment, and the access controller 16 permits the access with a limitation, the access controller 16 limits the access at a network module level. For example, in a case where writing and updating are prohibited, and only browsing is permitted when the access is necessary for executing the box function, conventionally, the access is not limited at the network module level. Specifically, the writing and the updating are limited in a function processing module or the like mainly by software, with the ports for writing, updating and browsing all kept valid, regardless of whether these ports are shared or separated. In the present embodiment, on the other hand, the ports for writing, updating and browsing are separately prepared, and the access controller 16 cuts the connection with the port for writing and the port for updating, and permits the connection with the port for browsing. In such a way, an illegal access will be difficult, and there is an advantage that a trouble such as a bug due to a certain combination of a function or a program with a port can be comparatively easily prevented.

When the access controller 16 permits the access necessary for executing the corresponding function in the second method, the presentation instruction part 17 instructs the user terminal 20 to present a message that the access necessary for executing the corresponding function in the first method is limited, and that the access necessary for executing the corresponding function in the second method is permitted. When the access controller 16 prohibits any access necessary for executing the corresponding function, the presentation instruction part 17 instructs the user terminal 20 to present a message that the access necessary for executing the corresponding function is prohibited. When the setting of the automatic change is OFF, and the access controller 16 permits the access necessary for executing the corresponding function in the second method, the presentation instruction part 17 instructs the user terminal 20 to present a factor that causes the limitation of the access necessary for executing the corresponding function in the first method, and a selection screen that encourages the user to make a selection as to whether to execute the corresponding function in the second method, or to cancel the execution. Here, the automatic change is a function of automatically executing the corresponding function in the second method without presenting the selection screen that encourages the user to make a selection as to whether to execute the corresponding function in the second method, or to cancel the execution, when the access necessary for executing the corresponding function in the first method is limited and the access necessary for executing the corresponding function in the second method is permitted. A manager or the like that manages the multifunction peripheral 10 pre-registers the setting of whether the automatic change is valid (ON) or invalid (OFF), and can change this setting arbitrarily.

The selection receiver 18 receives, from the user terminal 20, the selection made by the user as to whether to execute the corresponding function in the second method, or to cancel the execution.

When the setting of the automatic change is ON, the execution part 19 executes the corresponding function in the first method if the access controller 16 permits the access necessary for executing the corresponding function in the first method; and the execution part 19 executes the corresponding function in the second method when the access controller 16 permits the access necessary for executing the corresponding function in the second method. When the setting of the automatic change is OFF, the execution part 19 receives, from the user terminal 20, selection made by the user on the selection screen that the presentation indication part 17 instructs the user terminal 20 to present, and executes the selected processing in accordance with the selection made by the user.

The user authentication part 21 identifies the user or the user group such as the division to which the user belongs, based on a login code and a password input by the user or information read by a card reader from a pre-registered IC card. Then, the user authentication part 21 outputs the user ID or the user group ID.

The access request part 22 transmits, to the multifunction peripheral 10, the request for the access necessary for executing one of the plurality of functions of the multifunction peripheral 10, based on the input such as the selection of a function made by the user. In the present embodiment, the request for the access includes the user ID or the user group ID outputted by the user authentication part 21, and a function name that relates to the request for the access inputted by the user.

The security information storage part 23 stores therein the security information. Note that the security information is updated in a timely manner in accordance with the change in the state of the user terminal 20.

The security information transmitter 24 transmits the security information stored in the security information storage part 23 in response to the request received from the security information acquisition part 13 included in the multifunction peripheral 10.

The message presentation part 25 presents, according to the instruction received from the presentation instruction part 17 included in the multifunction peripheral 10, a message that the access necessary for executing the corresponding function in the first method is limited, and that the access necessary for executing the corresponding function in the second method is permitted, and a message that the access necessary for executing the corresponding function is totally prohibited.

FIG. 4A shows an example of the message shown by the message presentation part 25 when the access necessary for executing the corresponding function in the first method is limited, and the access necessary for executing the corresponding function in the second method is permitted, and FIG. 4B shows an example of the message shown by the message presentation part 25 when any access necessary for executing the corresponding function is totally prohibited.

When the setting of the automatic change is OFF, the selection screen presentation part 26 presents, according to the instruction received from the presentation instruction part 17 included in the multifunction peripheral 10, a factor that causes the limitation of the access necessary for executing the corresponding function in the first method, and a selection screen that encourages the user to make a selection as to whether to execute the corresponding function in the second method, or to cancel the execution.

FIG. 5A shows an example of the message presented by the selection screen presentation part 26 showing the factor that causes the limitation of the access necessary for executing the corresponding function in the first method, and FIG. 5B shows an example of the selection screen presented by the selection screen presentation part 26.

Receiving the selection by the user on the selection screen presented by the selection screen presentation part 26, as to whether to execute the corresponding function in the second method, or to cancel the execution, the selection part 27 transmits the selection made by the user to the multifunction peripheral 10.

The execution auxiliary part 28 assists the multifunction peripheral with the execution.

<Operation>

FIG. 6 shows an outline of an operation and information flow for the print job.

The following describes the outline of the operation and information flow for the print job, with use of FIG. 6.

(1) The access request part 22 included in the user terminal 20 transmits, to the access request receiver 12 included in the multifunction peripheral 10, the request for the access necessary for executing the print job, based on the instruction made by the user (P1).

(2) The security information acquisition part 13 included in the multifunction peripheral 10 transmits, to the user terminal 20, the request for the security information (P2).

(3) The security information transmitter 24 included in the user terminal 20 transmits the security information to the multifunction peripheral 10 (P3).

Here, the judgment part 15 included in the multifunction peripheral 10 judges whether the security criterion set for the print job is met, and there are three types of operations according to results of the judgment.

When the result is the first result in which the security criterion set for the first method is met (Case A), the operations described in the following P4 to P6 are performed. For example, the first method corresponds to "Store in HDD" (the item in the "Detail of function" column) in the security criterion table shown in FIG. 3.

(4) The execution part 19 included in the multifunction peripheral 10 notifies the user terminal 20 that the access necessary for executing the print job in the first method is permitted (P4).

(5) The execution auxiliary part 28 included in the user terminal 20 transmits print job data (P5).

(6) The execution part 19 included in the multifunction peripheral 10 executes the print job in the first method, and notifies the user terminal 20 of the completion of the execution (P6).

When the result is the second result in which the security criterion set for the first method is not met and the security criterion set for the second method is met, the operation is divided further into two types of operations depending on the setting of the automatic change. For example, the second method corresponds to the "Use of memory" (the item in the "Detail of function" column) in the security criterion table shown in FIG. 3.

When the result is the second result, and the setting of the automatic change is ON (Case B), the following operations P7 to P9 are performed.

(7) The execution part 19 included in the multifunction peripheral 10 notifies the user terminal 20 that the access necessary for executing the print job in the second method is permitted. Also, the presentation part 17 instructs the user terminal 20 to present a message that the access necessary for executing the print job in the first method is limited, and that the access necessary for executing the print job in the second method is permitted (P7).

(8) The message presentation part 25 included in the user terminal 20 presents the message that the access necessary for executing the print job in the first method is limited, and that the access necessary for executing the print job in the second method is permitted, and the execution auxiliary part 28 included in the user terminal 20 transmits the print job data (P8).

(9) The execution part 19 included in the multifunction peripheral 10 executes the print job in the second method, and notifies the user terminal 20 of the completion of the execution (P9).

When the result is the second result, and the setting of the automatic change is OFF (Case C), the following operations P10 to P12 are performed.

(10) The execution part 19 included in the multifunction peripheral 10 notifies the user terminal 20 that the access necessary for executing the print job in the second method is permitted. Also, the presentation instruction part 17 instructs the user terminal 20 to present a factor that causes the limitation of the access necessary for executing the print job in the first method, and a selection screen that encourages the user to make a selection as to whether to execute the print job in the second method, or to cancel the print job (P10).

(11) The message presentation part 25 included in the user terminal 20 presents the message that the access necessary for executing the print job in the first method is limited, and that the access necessary for executing the print job in the second method is permitted. Also, the selection screen presentation part 26 included in the user terminal 20 presents the factor that causes the limitation of the access necessary for executing the print job in the first method, and the selection screen that encourages the user to make a selection as to whether to execute the print job in the second method, or to cancel the print job. Upon receiving the selection made by the user, the selection part 27 transmits the selection to the multifunction peripheral 10. Here, when the execution of the print job in the second method is selected, the execution auxiliary part 28 included in the user terminal 20 transmits the print job data (P11).

(12) Upon receiving the selection made by the user, the execution part 19 included in the multifunction peripheral 10 performs the execution according to the selection. When the execution of the print job in the second method is selected, the execution part 19 notifies the user terminal 20 of completion of the execution of the print job in the second method after the execution is finished, and when the cancellation of the print job is selected, the execution part 19 notifies the user terminal 20 of the cancellation after the cancel processing (P12).

If the result is the third result that neither the security criterion set for the first method nor the security criterion set for the second method are met (Case D), the following operation P13 is performed.

(13) The presentation instruction part 17 included in the multifunction peripheral 10 instructs the user terminal 20 to present a message that any access necessary for executing the corresponding function is prohibited (P13).

FIG. 7 shows an outline of the operation and information flow for the scan job.

The following describes the outline of the operations performed by the scan job and the information flow.

(1) The security information acquisition part 13 included in the multifunction peripheral 10 transmits, to the user terminal 20, a request for the security information, based on the instruction received from the user (P21).

(2) The security information transmitter 24 included in the user terminal 20 transmits the security information to the multifunction peripheral 10 (P22).

According to the scan job, since different security criteria are set depending on whether the user specifies data as a confidential document or as a normal document, the judgment part 15 included in the multifunction peripheral 10 obtains a different result depending on a type of the document. The operation is divided into two types of operations according to the result of the judgment.

When the result is the first result in which the security criterion is met (Case A), the following operations P23 to P25 are performed.

(3) The execution part 19 included in the multifunction peripheral 10 notifies the user terminal 20 that the access is permitted (P23).

(4) The execution part 19 included in the multifunction peripheral 10 scans the document, and transmits the document to the user terminal 20 (P24).

(5) The execution part 19 included in the multifunction peripheral 10 notifies the user terminal 20 that the scan job has been completed (P25).

In the case of the scan job, there is no second method. Therefore, there is no case of the second result. Accordingly, there are neither (Case B) nor (Case C).

When the result is the third result in which the security criterion set for the scan job is not met (Case D), the following operation P26 is performed.

(6) The presentation instruction part 17 included in the multifunction peripheral 10 instructs the user terminal 20 to present a message that the access necessary for executing the corresponding function is prohibited (P26).

FIG. 8 shows an outline of operation and information flow for the box job.

(1) The access request part 22 included in the user terminal 20 transmits, to the access request receiver 12 included in the multifunction peripheral 10, the request for the access necessary for executing the box job, based on the instruction received from the user (P31).

(2) The security information acquisition part 13 included in the multifunction peripheral 10 transmits, to the user terminal 20, a request for the security information (P32).

(3) The security information transmitter 24 included in the user terminal 20 transmits the security information to the multifunction peripheral 10 (P33).

Here, the judgment part 15 included in the multifunction peripheral 10 judges whether or not the security criterion set for the box job is met. The operation is divided into three types of operations according to the result of the judgment.

When the result is the first result in which the security criterion set for the first method is met (Case A), the following operations P34 to P36 are performed. For example, the first method corresponds to the "Confidential box update" (the item in the "Detail of function" column) in the security criterion table shown in FIG. 3.

(4) The execution part 19 included in the multifunction peripheral 10 notifies the user terminal 20 that the access necessary for executing the box job in the first method is permitted (P34).

(5) The execution auxiliary part 28 included in the user terminal 20 transmits, to the multifunction peripheral 10, a request for processing the box job (P35).

(6) The execution part 19 included in the multifunction peripheral 10 processes the box job in the first method, and then notifies the user terminal 20 of the completion of the processing (P36).

When the security criterion set for the first method is not met, and the security criterion set for the second method is met, the operation is divided further into two types of operations depending on the setting of the automatic change. For example, the second method corresponds to "Browsing only" (an item in the "Detail of function" column), and "Shared box update" (an item in the "Detail of function" column) in the security criterion table shown in FIG. 3. Also, the "Shared box update" is preferentially adopted when both of the security criteria are met.

When the result is the second result, and the setting of the automatic change is ON (Case B), the following operations P37 to P39 are performed.

(7) The execution part 19 included in the multifunction peripheral 10 notifies the user terminal 20 that the access necessary for executing the corresponding job in the second method is permitted. The presentation instruction part 17 instructs the user terminal 20 to present a message that the access necessary for executing the corresponding job in the first method is limited, and the access necessary for executing the corresponding job in the second method is permitted (P37).

(8) The message presentation part 25 included in the user terminal 20 presents the message that the access necessary for executing the corresponding job in the first method is limited, and that the access necessary for executing the corresponding job in the second method is permitted. The execution auxiliary part 28 included in the user terminal 20 transmits, to the multifunction peripheral 10, a request for processing the box job in the second method (P38).

(9) The execution part 19 included in the multifunction peripheral 10 processes the box job in the second method, and then notifies the user terminal 20 of the completion of the process (39).

When the result is the second result, and the setting of the automatic change is OFF (Case C), the following operations P40 to P42 are performed.

(10) The execution part 19 included in the multifunction peripheral 10 notifies the user terminal 20 that the access necessary for executing the box job in the second method is permitted. Also, the presentation instruction part 17 instructs the user terminal 20 to present a factor that causes the limitation of the access necessary for executing the box job in the first method, and a selection screen that encourages the user to make a selection as to whether to execute the box job in the second method, or to cancel the box job (P40).

(11) The message presentation part 25 included in the user terminal 20 presents the message that the access necessary for executing the box job in the first method is limited, and the access necessary for executing the box job in the second method is permitted. The selection screen presentation part 26 included in the user terminal 20 presents the factor that causes the limitation of the access necessary for executing the box job in the first method, and the selection screen that encourages the user to make a selection as to whether to execute the corresponding job in the second method, or to cancel the corresponding job. The selection part 27 receives the selection made by the user, and transmits the selection to the multifunction peripheral 10. When the execution of the corresponding job in the second method is selected, the execution auxiliary part 28 included in the user terminal 20 transmits, to the multifunction peripheral 10, a request for processing the box job in the second method (P41).

(12) Receiving the selection made by the user, the execution part 19 included in the multifunction peripheral 10 executes the job according to the selection. When the execution part 19 executes the job in the second method, the execution part 19 notifies the user terminal 20 of the completion of the job after the execution of the job is finished. When the execution of the job is cancelled, the execution part 19 notifies the user terminal 20 of the cancellation after completing the cancel processing (P42).

If the result is the third result in which neither the security criterion set for the first method nor the security criterion set for the second method are met (Case D), the following operation P43 is performed.

(13) The presentation instruction part 17 included in the multifunction peripheral 10 instructs the user terminal 20 to present a message that the access necessary for executing the corresponding function is prohibited (P43).

<Control Method>

Figure 9:
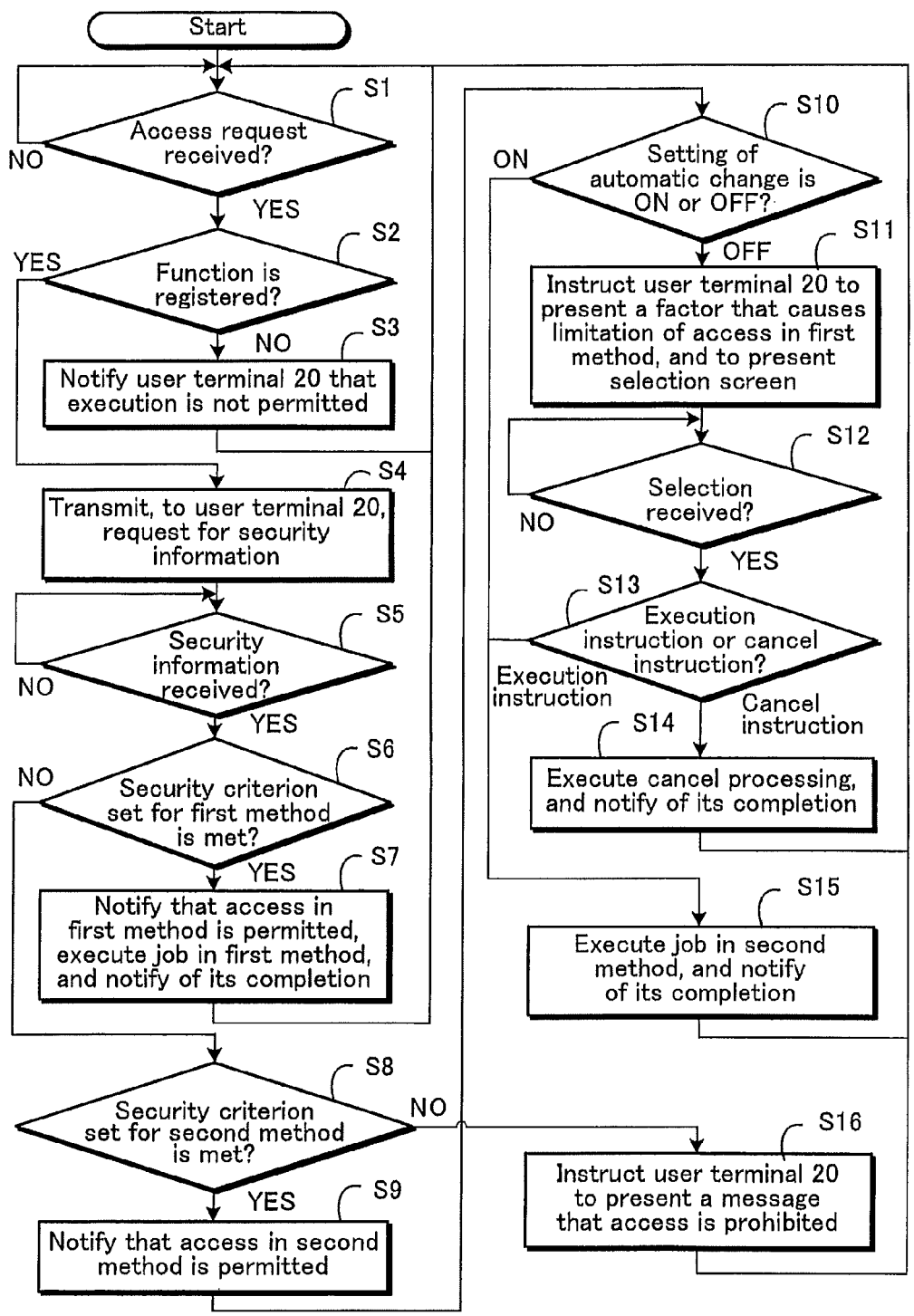
FIG. 9 shows an outline of control performed by the multifunction peripheral 10.

FIG. 9 shows an outline of control performed by the multifunction peripheral 10.

The following describes the control method performed by the multifunction peripheral 10 with use of FIG. 9.

(1) The access request receiver 12 waits for a request for an access necessary for executing one of the functions (Step S1).

(2) Upon receiving the request for the access necessary for executing one of the functions (Step S1: YES), the multifunction peripheral 10 judges whether or not the received function is registered in the security criterion table held in the security criterion table holding part 11, based on the user ID or the user group ID included in the request for the access (Step S2).

(3) When the function is not registered (Step S2: NO), the multifunction peripheral 10 notifies the user terminal 20 that execution of the function is not permitted (Step S3), and waits for a request for an access.

(4) When the function is registered (Step S2: YES), the security information acquisition part 13 transmits, to the user terminal 20, a request for the security information (Step S4).

(5) The multifunction peripheral 10 waits for the security information from the user terminal 20 (Step S5).

(6) Upon receiving the security information (Step S5: YES), the judgment part 15 judges whether or not the security criterion set for the first method is met (Step S6).

(7) When the security criterion set for the first method is met (Step S6: YES), the execution part 19 notifies the user terminal 20 that the access necessary for executing the corresponding job in the first method is permitted, executes a job corresponding to the function in the first method, notifies the user terminal 20 of a completion of the execution after the completion (Step S7), and waits for a request for an access.

(8) When the security criterion set for the first method is not met (Step S6: NO), the judgment part 15 judges whether or not the security criterion set for the second method is met (Step S8). However, if the second method is not registered, the judgment part 15 judges that the security criterion set for the second method is not met. Also, if there are plural security criteria set for the second method, the judgment part 15 preferentially judges the criteria starting from the strictest to the less strict criterion, in general, and a method of which security criterion is judged to be met first is adopted.

(9) When the security criterion set for the second method is met (Step S8: YES), the execution part 19 notifies the user terminal 20 that the access necessary for executing the corresponding job in the second method is permitted (Step S9).

(10) The multifunction peripheral 10 judges whether the setting of the automatic change is ON or OFF (Step S10).

(11) When the setting of the automatic change is OFF (Step S10: OFF), the presentation instruction part 17 instructs the user terminal 20 to present a factor that causes the limitation of the access necessary for executing the corresponding job in the first method, and a selection screen (Step S11).

(12) The execution part 19 waits for the selection made by the user from the user terminal 20 (Step S12).

(13) The judgment part 15 judges whether the received selection is to execute the corresponding job in the second method or to cancel the corresponding job (Step S13).

(14) When the selection is to cancel the corresponding job (Step S13: Cancellation instruction), the execution part 19 executes the cancel processing, then notifies the user terminal 20 of the completion of the processing after the processing is finished (Step S14), and waits for a request for an access.

(15) When the selection is to execute the corresponding job (Step S13: Execution instruction), and the setting of the automatic change is ON (Step S10: ON), the execution part 19 executes the job in the second method, then notifies a completion of the execution after the execution is finished (Step S15), and waits for a request for an access.

(16) When the security criterion set for the second method is not met (Step S8: NO), the presentation instruction part 17 instructs the user terminal 20 to present a message that the access necessary for executing the function is prohibited (Step S16), and waits for a request for an access.

Figure 10:
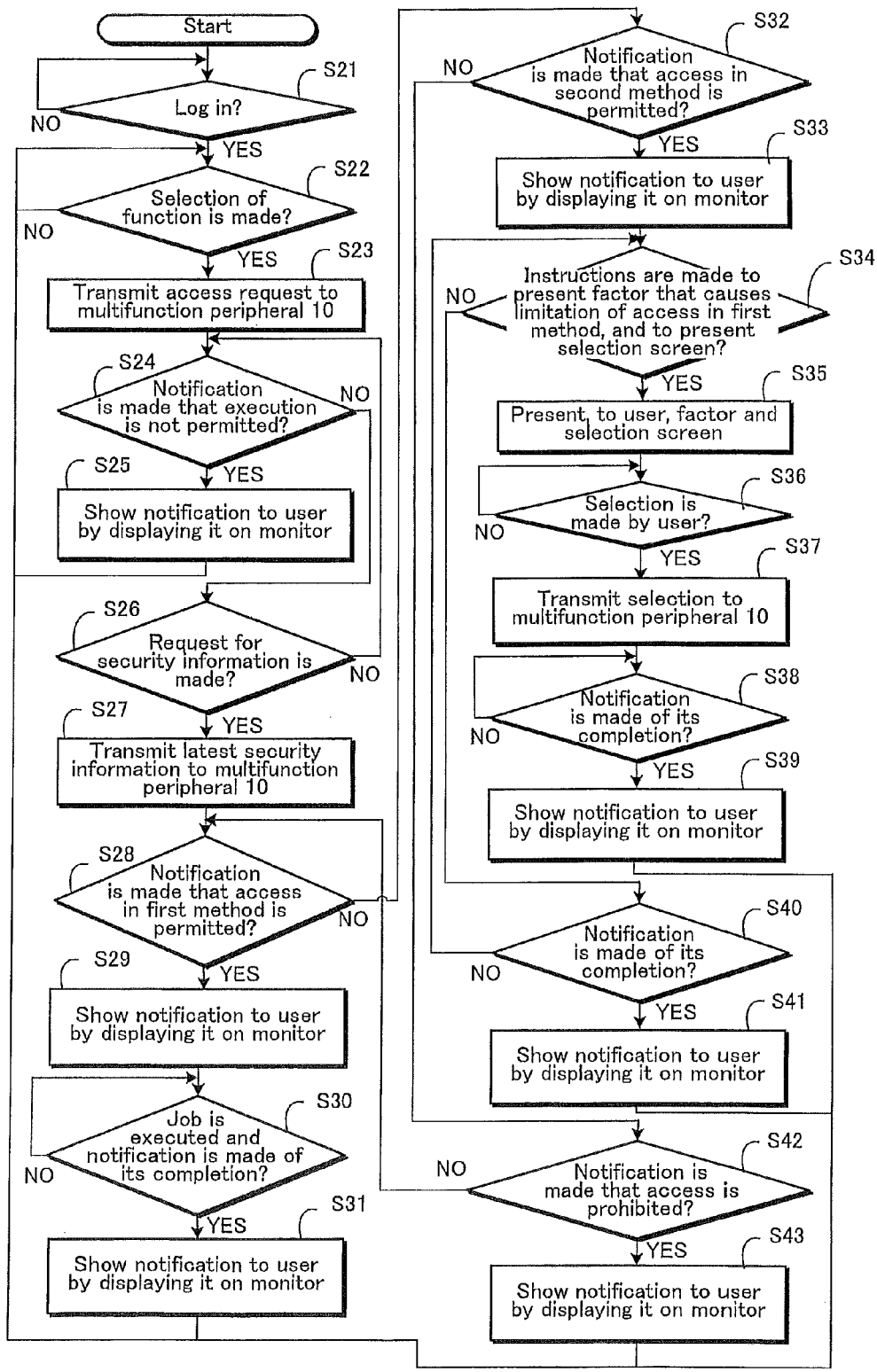
FIG. 10 shows an outline of control performed by the user terminal 20.

FIG. 10 shows an outline of control performed by the user terminal 20.

The following describes a control method performed by the user terminal 20 with use of FIG. 10.

(1) The user authentication part 21 waits until the user logs in (Step S21).

(2) After the completion of the login (Step S21: YES), the user terminal 20 waits until the user selects the function, (Step S22).

(3) When one of the functions is selected upon job entry (Step S22: YES), the access request part 22 transmits, to the multifunction peripheral 10, a request for an access necessary for executing the selected function (Step S23).

(4) In a response from the multifunction peripheral 10, the user terminal 20 judges whether the notification is made that the execution is not permitted (Step S24).

(5) When the notification is made that the execution is not permitted (Step S24: YES), the user terminal 20 shows the notification to the user by displaying it on a monitor, for example (Step S25), and waits for another function selection.

(6) When the notification is not made that the execution is not permitted (i.e. the notification is made that the execution is permitted) (Step S24: NO), the user terminal 20 waits for a request for the security information (Step S26).

(7) When the request for the security information is made (Step S26: YES), the user terminal 20 transmits the latest security information to the multifunction peripheral 10 (Step S27).

(8) The user terminal 20 judges whether the notification is made that the access necessary for executing the corresponding job in the first method is permitted (Step S28).

(9) When the notification is made that the access necessary for executing the corresponding job in the first method is permitted (Step S28: YES), the user terminal 20 shows the notification to the user by displaying it on the monitor, for example (Step S29).

(10) The user terminal 20 waits until a notification is made that the execution of the job in the first method has been completed (Step S30).

(11) When the notification is made that the execution of the job in the first method has been completed (Step S30: YES), the user terminal 20 shows the notification to the user by displaying it on the monitor, for example (Step S31), and waits for another function selection.

(12) When the notification is not made that the access necessary for executing the corresponding job in the first method is permitted in Step S28 (Step S28: NO), the user terminal 20 judges whether the notification is made that the access necessary for executing the corresponding job in the second method is permitted (Step S32).

(13) When the notification is made that the access necessary for executing the corresponding job in the second method is permitted (Step S32: YES), the user terminal 20 shows the notification to the user by displaying it on the monitor, for example (Step S33).

(14) The user terminal 20 judges whether an instruction for presenting a factor that causes the limitation of the execution of the corresponding job in the first method and an instruction for presenting the selection screen are made (Step S34).

(15) When the instruction for presenting a factor that causes the limitation of the execution of the corresponding job in the first method and the instruction for presenting the selection screen are made (Step S34: YES), the user terminal 20 presents the factor and the selection screen to the user by displaying them on the monitor, for example, and encourages the user to make a selection as to whether to execute the corresponding job in the second method or to cancel the corresponding job (Step S35).

(16) The user terminal 20 waits until the user makes a selection (Step S36).

(17) The user terminal 20 transmits, to the multifunction peripheral 10, the selection made by the user (Step S37).

(18) The user terminal 20 waits for a notification of the completion of the execution of the corresponding job in the second method or a notification of the completion of the cancellation processing of the corresponding job (Step S38).

(19) The user terminal 20 shows the notification to the user by displaying it on the monitor, for example (Step S39), and waits for another function selection.

(20) When the instruction for presenting a factor that causes the limitation of the execution of the corresponding job in the first method and the instruction for presenting the selection screen are not made in Step S34 (Step S34: NO), the setting of the automatic change is ON. Therefore, since the corresponding job is automatically executed in the second method, the user terminal 20 waits until a notification of the completion of the execution of the corresponding job in the second method is made (Step S40).

(21) When the notification of the completion of the corresponding job executed in the second method is made (Step S40: YES), the user terminal 20 shows the notification to the user by displaying it on the monitor, for example (Step S41), and waits for another function selection.

(22) When a notification is not made that the access necessary for executing the corresponding job in the second method is permitted in Step S32 (Step S32: NO), neither the notification that the access necessary for executing the corresponding job in the first method is permitted nor the notification that the access necessary for executing the corresponding job in the second method is permitted is not made. Therefore, the user terminal 20 judges whether or not an instruction has been made for presenting a message that the access necessary for executing the function is prohibited (Step S42).

(23) When the instruction is not made for presenting the message that the access necessary for executing the function is prohibited (Step S24: NO), the notification regarding the access has not been made. Therefore, the user terminal 20 returns to Step S28, and judges whether the access necessary for executing the function in the first method is permitted. When the instruction is made for presenting the message that the access necessary for executing the function is prohibited (Step S42: YES), the user terminal 20 presents, to the user, a message that the access necessary for executing the function is prohibited, by displaying the message on the monitor, for example (Step S43), and returns to the function selection.

<Conclusion>

As mentioned in the above, according to the first embodiment, when a user terminal does not meet the security criterion set for each of the functions, an access is prohibited or a limited access is permitted. Therefore, it is possible to set a criterion at an appropriate security level. Thus, the usability can be improved while lowering a risk of the data alteration, the information leakage and the like.

Second Embodiment

<Outline>

The second embodiment has the same features as the first embodiment. Furthermore, in the second embodiment, the security information is regularly obtained, the setting (security information or a security criterion) is updated, and as a result, a warning message is presented when the security problem occurs. Also, when a predetermined time period elapses with the security problem left unsolved despite that the warning message is presented, the network is disconnected.

<Structure>

The following describes differences between the first embodiment and the second embodiment.

Figure 11:
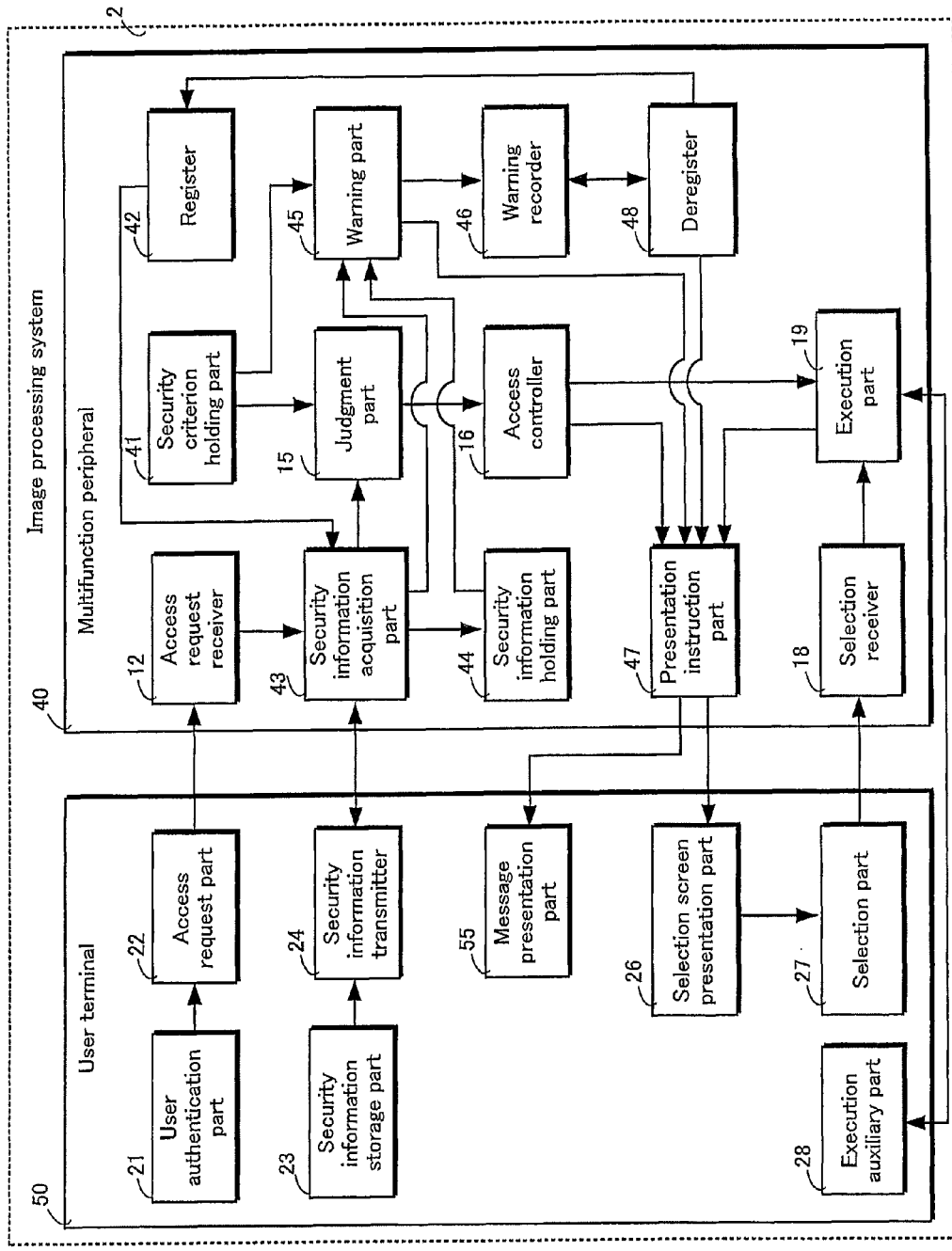
FIG. 11 shows an outline of an image processing system described in a second embodiment.

FIG. 11 shows an outline of the image processing system in the second embodiment.

Here, the same numerals are given to elements that are identical with the elements described in the first embodiment, and the description thereof is omitted.

An image processing system 2 described in the present embodiment is composed of an multifunction peripheral 40 and a user terminal 50 that are connected and can communicate with one another through the network 30.

The multifunction peripheral 40 is different from the multifunction peripheral 10 described in the first embodiment in the following. That is, the multifunction peripheral 40 includes a security criterion holding part 41 instead of the security criterion holding part 11, a security information acquisition part 43 instead of the security information acquisition part 13, a security information holding part 44 instead of the security information holding part 14 and a presentation instruction part 47 instead of the presentation instruction part 17. The multifunction peripheral 40 further includes a register 42, a warning part 45, a warning recorder 46 and a deregister 48.

The security criterion holding part 41 holds a previously acquired security criterion table as well as a latest security criterion table.

The register 42 registers therein external terminals that are expected to be accessed in the future (e.g. external terminals that have been previously connected).

In addition to the functions of the security information acquisition part 13, the security information acquisition part 43 not only acquires the security information when receiving the request for the access, but also regularly acquires the security information from external terminals that are registered in the register 42, and those expected to be accessed in the future, and those currently connected.

The security information holding part 44 holds, for each external terminal, a history of the security information acquired by the security information acquisition part 43.

The warning part 45 compares the security information regularly acquired, for each external terminal, by the security information acquisition part 43 with the previous security information held in the security information holding part 44. Also, the warning part 45 compares the current and previous security criteria held in the security criterion holding part 41. When there is a security problem regarding an updated item included in the security information and an updated item included in the security criteria, the warning part 45 instructs, via the presentation instruction part 47, the external terminal to present a warning message that notifies the external terminal of the security problem. Here, the security problem is caused when there is a function whose security criterion is not met, due to an updated item included in the newly acquired security information or an updated item included in the security criteria. The warning message presented in such a case includes the function name and the security criteria including the item that causes the security problem.

The warning recorder 46 records therein, together with a time, information indicating that the warning part 45 is caused to present a warning message.

When the predetermined time period has been elapsed with the security problem left unsolved in the external terminal that is caused to present the warning message by the warning part 45, the deregister 48 deregisters the external terminal that has been registered in the register 42, and excludes it from a target. Then, the deregister 48 instructs, via the presentation instruction part 47, the external terminal to present a deregistration message that notifies that the external terminal has been deregistered. Furthermore, when the external terminal is currently connected, the warning part 45 instructs, via the presentation instruction part 47, the external terminal to present a disconnection message and forcibly cuts the connection.

In addition to the functions of the presentation instruction part 17, the presentation instruction part 47 further includes functions of receiving the instruction for presenting the warning message from the warning part 45 and transmitting the instruction to the user terminal 20; and receiving, from the deregister 48, the instruction for presenting the deregistration message and the disconnection message and transmitting these messages to the user terminal 20.

The user terminal 50 is different, from the user terminal 20 described in the first embodiment, in the following. That is, the user terminal 50 includes a message presentation part 55 instead of the message presentation part 25.

In addition to the functions of the message presentation part 25, the message presentation part 55 further includes functions of presenting the warning message according to the instruction received from the warning part 45 included in the multifunction peripheral 40, and presenting the deregistration message and the disconnection message according to the instruction received from the deregister 48 included in the multifunction peripheral 40.

FIG. 12A shows an example of the warning message presented by the message presentation part 55, FIG. 12B shows an example of the deregistration message presented by the message presentation part 55, and FIG. 12C shows an example of the disconnection message presented by the message presentation part 55.

<Control Method>

Figure 13:
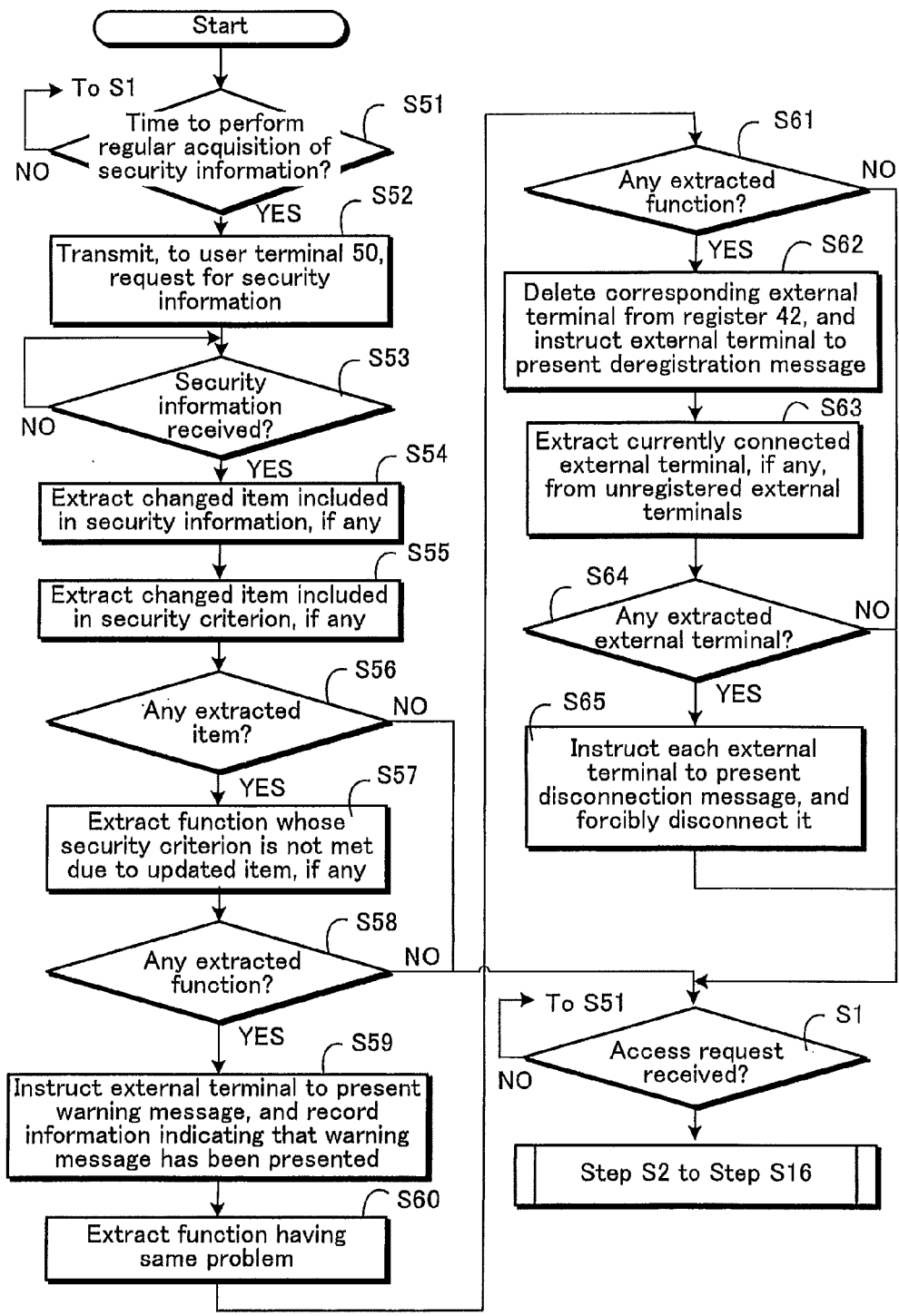
FIG. 13 shows an outline of control performed by the multifunction peripheral 40.

FIG. 13 shows an outline of control performed by the multifunction peripheral 40.

The following describes a control method performed by the multifunction peripheral 40 with use of FIG. 13.

(1) The multifunction peripheral 40 waits for a time to regularly acquire the security information (Step S51). The time to regularly acquire the security information may be set at an interval of a few hours or may be the same hour every day.

(2) When it is time to regularly acquire the security information (Step S51: YES), the security information acquisition part 43 transmits a request for the security information to the external terminals that have been registered in the register 42, and are expected to be accessed in the future, and the currently connected external terminal (Step S52). Note that the following description is given regarding a case where the security information is transmitted to the user terminal 50 as an example.

(3) The multifunction peripheral 40 waits for receiving the security information from the user terminal 50 to which the request for the security information has been transmitted (Step S53).

(4) Receiving the security information (Step S53: YES), the warning part 45 compares the newly received security information with the previously received security information held in the security information holding part 44, and extracts changed items included in the newly received security information (Step S54).

(5) The warning part 45 compares the previous and current security criteria held in the security criterion holding part 41, and extracts changed items included in the security criteria, if any (Step S55).

(6) The multifunction peripheral 40 judges whether or not there is any item extracted in Step S54 or Step S55 (Step S56). When there is no extracted item (Step S56: NO), the multifunction peripheral 40 waits for a request for an access.

(7) When there is the extracted item (Step S56: YES), the multifunction peripheral 40 extracts, a function whose security criterion is not met due to an updated item included in the currently received security information or an updated item included in the security criteria, if any (Step S57).

(8) The multifunction peripheral 40 judges whether there is a function that has been extracted in Step S57 (Step S58). When there is no extracted items (Step S58: NO), the multifunction peripheral 40 waits for a request for an access.

(9) When there is the extracted function (Step S58: YES), the warning part 45 instructs the corresponding external terminal to present a warning message, and stores, in the warning recorder 46, information indicating that the warning message has been presented (Step S59).

(10) The multifunction peripheral 40 compares the newly extracted functions with the previously extracted functions that are recorded in the warning recorder 46, and extracts a function that has had the same problem for a predetermined time period, if any (Step S60).

(11) The multifunction peripheral 40 judges whether there is a function that has been extracted in Step S60 (Step S61). If there is no extracted function (Step S61: NO), the multifunction peripheral 40 waits for a request for an access.

(12) When there is the extracted function (Step S61: YES), the deregister 48 deregisters the corresponding external terminal that has been registered in the register 42, excludes the corresponding terminals from targets that are expected to be accessed in the future, and instructs the corresponding external terminals to present a deregistration message (Step S62).

(13) The multifunction peripheral 40 extracts a currently connected external terminal from among the external terminals that have been deregistered in Step S62, if any (Step S63).

(14) The multifunction peripheral 40 judges whether or not there is an external terminal that has been extracted in Step S63 (Step S64). When there is no extracted external terminal (Step S64: NO), the multifunction peripheral 40 waits for a request for an access.

(15) If there is any extracted external terminal (Step S64: YES), the multifunction peripheral 40 instructs each extracted external terminal to present a disconnection message that notifies that the connection is cut, and forcibly cuts the connection (Step S65).

(16) Steps S1 to S16 are the same as (1) to (16) shown in FIG. 9 described in the first embodiment.

Note that although the multifunction peripheral 40, in the above embodiment, compares each function that has been extracted in Step S57 with the previously extracted function that has been recorded in the warning recorder 46, and extracts the function that has had the same problem for the predetermined time period, if any, the extraction method is not limited to this, and the following is possible. That is, the multifunction peripheral 40 may refer to the security information received in Step S53 and the security criteria at the time of the reception to extract all functions whose security criteria are not met at the time of the reference, and refer to a history of the previously extracted functions stored in an appropriate storage device to extract a function that has had the same problem in the predetermined time period, if any.

<Conclusion>

As mentioned in the above, according to the second embodiment of the present invention, it is possible to obtain the same effect as the effect obtained in the first embodiment. Furthermore, according to the second embodiment, the warning message is displayed when there is the security problem due to the items in the security information or the security criterion that have been changed. Therefore, it is possible to always keep external terminals in secure condition. Also, since the external terminals having the unsolved security problem for a time period that is equal to or more than the predetermined time period are deregistered, and the currently connected external terminals are disconnected, it is possible to maintain the security level of each external terminal regardless of whether or not the execution of the job is performed.

Note that a program that is capable of causing a computer to execute the operations described in the first embodiment or the second embodiment may be recorded on a computer-readable recording medium, and such a recording medium can become a focus of business transactions. Also, the program may become the focus of business transactions via a network, for example, and can be presented to the user by being displayed on a display device or being printed out.

The recording medium is, for example, any removable recording medium such as a floppy disk, a CD, an MO, a DVD or a memory card, or a fixed recording medium such as a hard disk or a semiconductor memory, and is not specifically limited to those described above.

The present invention is widely applicable to a technical field of the multifunction peripheral having a plurality of functions including the image forming function.

According to the present invention, it is possible to set, for each external terminal, a criterion of a security level for each function, and to easily set an appropriate criterion according to a level of a risk and a characteristic difference regarding each function. Therefore, the usability can be improved, while lowering a risk of the data alteration, the information leakage and the like. Thus, the present invention is highly useful in the industry.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A multifunction peripheral having a plurality of image processing functions including an image forming function, the multifunction peripheral comprising:
   a holding part holding therein security criteria set for the image processing functions in one-to-one correspondence;
   a receiver operable to receive, from an external terminal, a request for an access that is necessary for executing at least one of the image processing functions;
   an acquisition part operable to acquire, from the external terminal, security information that is a security indicator regarding the access from the external terminal;
   a judgment part operable to judge whether or not one of the security criteria set for the at least one of the image processing functions is met, based on the acquired security information;
   an access controller operable, if the judgment part judges affirmatively, to permit the access, and if the judgment part judges negatively, to prohibit the access or permit the access with a limitation;
   an execution part operable to execute the at least one of the image processing functions, if the access controller permits the access; and
   a hard disk drive, wherein
   one or more of the security criteria set for corresponding one or more of the image processing functions that requires an access to the hard disk drive are stricter than one or more of the security criteria set for corresponding one or more of the image processing functions that do not require the access to the hard disk drive.

2. A multifunction peripheral having a plurality of image processing functions including an image forming function, the multifunction peripheral comprising:
   a holding part holding therein security criteria set for the image processing functions in one-to-one correspondence;
   a receiver operable to receive, from an external terminal, a request for an access that is necessary for executing at least one of the image processing functions;
   an acquisition part operable to acquire, from the external terminal, security information that is a security indicator regarding the access from the external terminal;
   a judgment part operable to judge whether or not one of the security criteria set for the at least one of the image processing functions is met, based on the acquired security information;
   an access controller operable, if the judgment part judges affirmatively, to permit the access, and if the judgment part judges negatively, to prohibit the access or permit the access with a limitation;
   an execution part operable to execute the at least one of the image processing functions, if the access controller permits the access;
   wherein the acquired security information includes a result of a virus scan performed on the external terminal, the security criteria include information on a predetermined virus, and if the result of the virus scan indicates that the predetermined virus is detected in the external terminal, the judgment part judges negatively; and wherein
   the acquired security information further includes a most recent date of the virus scan of the external terminal,
   the security criteria include a longest permissible time period from a date of a last virus scan to a date of an execution of a corresponding one of the image processing functions, and
   the judgment part judges whether or not the longest permissible time period has elapsed since the most recent date.

3. The multifunction peripheral of claim 1, wherein
the acquired security information further includes whether or not software having a security problem is installed on the external terminal, and
if the software having the security problem is installed on the external terminal, the judgment part judges negatively.

4. The multifunction peripheral of claim 1, wherein
the acquired security information includes types of software installed on the external terminal,
the security criteria include information on approved software having no security problem, and
if the software installed on the external terminal includes unapproved software, the judgment part judges negatively.

5. The multifunction peripheral of claim 1, wherein
the acquired security information includes whether or not a storage medium that stores therein data that has not been encrypted is mounted on the external terminal, and
when the storage medium is mounted on the external terminal, the judgment part judges negatively.

6. The multifunction peripheral of claim 1, wherein
the acquired security information includes at least one of: a version of an OS of the external terminal; whether or not a patch is applied to the external terminal; and a latest update date of the OS of the external terminal,
each of the security criteria includes at least one of: a required version of an OS; a required patch; and a longest permissible time period from a date of a last update to a date of an execution of a corresponding one of the image processing functions, and the judgment part judges at least one of: whether or not the version of the OS of the external terminal is the required version of the OS; whether or not the required patch is applied to the external terminal; and whether or not the longest permissible time period has elapsed since the latest update date.

7. The multifunction peripheral of claim 1, wherein
one or more of the image processing functions can be selectively executed in one of: a first method that accesses the hard disk drive; and a second method that does not access the hard disk drive,
the security criteria include a security criterion that is set individually for each of the first method and the second method, the security criterion set for the first method being stricter than the security criterion set for the second method,
the judgment part further judges the one or more of the image processing functions to obtain one of results as follows:
a first result in which the security criterion set for the first method is met;
a second result in which the security criterion set for the first method is not met, and the security criterion set for the second method is met; and
a third result in which neither the security criterion set for the first method nor the security criterion set for the second method are met, and
the access controller: permits a first access that is necessary for executing the one or more of the image processing functions in the first method if the judgment part obtains the first result; permits a second access that is necessary for executing the one or more of the image processing functions in the second method if the judgment part obtains the second result; and prohibits any access that is necessary for executing the one or more of the image processing functions if the judgment part obtains the third result.

8. The multifunction peripheral of claim 7, wherein
the execution part executes the one or more of the image processing functions in the first method if the access controller permits the first access, and to execute the one or more of the image processing functions in the second method if the access controller permits the second access.

9. The multifunction peripheral of claim 7, further comprising
a presentation instruction part operable, if the access controller permits the second access, to instruct the external terminal to present a message that the first access is limited, and the second access is permitted; and if the access controller prohibits any access that is necessary for executing the one or more of the image processing functions, to instruct the external terminal to present a message that any access that is necessary for executing the one or more of the image processing functions is prohibited.

10. The multifunction peripheral of claim 9, wherein
if the access controller permits the second access, the presentation instruction part further instructs the external terminal to present a factor that has caused the limitation of the first access, and to present a selection screen that encourages a user to select between execution processing that executes the one or more of the image processing functions in the second method, and cancel processing that cancels an execution of the one or more of the image processing functions, and the execution part receives, from the external terminal, the selection made by the user, and executes the one or more of the image processing functions if the user selects the execution processing.

11. A multifunction peripheral having a plurality of image processing functions including an image forming function, the multifunction peripheral comprising:
a holding part holding therein security criteria set for the image processing functions in one-to-one correspondence;
a receiver operable to receive, from an external terminal, a request for an access that is necessary for executing at least one of the image processing functions;
an acquisition part operable to acquire, from the external terminal, security information that is a security indicator regarding the access from the external terminal;
a judgment part operable to judge whether or not one of the security criteria set for the at least one of the image processing functions is met, based on the acquired security information;
an access controller operable, if the judgment part judges affirmatively, to permit the access, and if the judgment part judges negatively, to prohibit the access or permit the access with a limitation;
an execution part operable to execute the at least one of the image processing functions, if the access controller permits the access;
wherein the acquisition part regularly acquires pieces of security information from external terminals regardless of whether the request for the access is received by the receiver, the external terminals including an external terminal that are expected to be accessed in a future and a currently connected external terminal, wherein the multifunction peripheral further comprises: a security information holding part holding therein each piece of the security information for a corresponding one of the external terminals; and
a warning part operable to compare, for each of the external terminals, a newly acquired piece of the security information with a previously acquired piece of the security information held in the security information holding part, and if the newly acquired piece of the security information includes one or more changed items that have security problems, to instruct a corresponding one of the external terminals to present a warning message that notifies of the changed items.

12. The multifunction peripheral of claim 11, further comprising,
a deregister operable, if a predetermined time period has elapsed with the security problems unsolved on the corresponding one of the external terminals that is caused to present the warning message, to exclude the corresponding one of the external terminals from a target that is expected to be accessed in the future, and to disconnect the corresponding one of the external terminals if the corresponding one of the external terminals is currently connected.

13. The multifunction peripheral of claim 1, wherein
the acquisition part is further operable to acquire identification information that specifies each user or each user group,
the holding part further holds therein the security criteria for each of the users or each of the user groups, and
the judgment part makes the judgment for each of the users or each of the user groups.

14. The multifunction peripheral of claim 1, wherein the access controller limits the access at a network module level when permitting the access with the limitation.

15. A control method of a multifunction peripheral having a plurality of image processing functions including an image forming function, the multifunction peripheral including a holding part holding therein security criteria set for the image processing functions, the control method comprising steps of:
- a reception step of receiving, from an external terminal, a request for an access that is necessary for executing at least one of the image processing functions, each of the plurality of image processing functions having a separate security level for requests received from the external terminal;
- an acquisition step of acquiring, from the external terminal, security information that is a security indicator regarding the access from the external terminal;
- a judgment step of judging whether or not one of the security criteria set for the at least one of the image processing functions is met, based on the acquired security information;
- an access control step of permitting the access if the judgment step judges affirmatively, and prohibiting the access or permitting the access with a limitation if the judgment step judges negatively;
- an execution step executing the at least one of the image processing functions, if the access control step permits the access;
- the acquired security information includes a result of a virus scan performed on the external terminal, the security criteria include information on a predetermined virus, and if the result of the virus scan indicates that the predetermined virus is detected in the external terminal, the judgment part judges negatively; and
- the acquired security information further includes a most recent date of the virus scan of the external terminal,
- the security criteria include a longest permissible time period from a date of a last virus scan to a date of an execution of a corresponding one of the image processing functions, and
- the judgment part judges whether or not the longest permissible time period has elapsed since the most recent date.

16. The method of claim 15, comprising:
providing the multifunction peripheral with a hard disk drive, wherein
one or more of the security criteria set for corresponding one or more of the image processing functions that requires an access to the hard disk drive are stricter than one or more of the security criteria set for corresponding one or more of the image processing functions that do not require the access to the hard disk drive.

17. The method of claim 15, wherein the acquisition part regularly acquires pieces of security information from external terminals regardless of whether the request for the access is received by the receiver, the external terminals including an external terminal that are expected to be accessed in a future and a currently connected external terminal, wherein the multifunction peripheral further comprises: a security information holding part holding therein each piece of the security information for a corresponding one of the external terminals; and
- a warning part operable to compare, for each of the external terminals, a newly acquired piece of the security information with a previously acquired piece of the security information held in the security information holding part, and if the newly acquired piece of the security information includes one or more changed items that have security problems, to instruct a corresponding one of the external terminals to present a warning message that notifies of the changed items.

18. A control method of a multifunction peripheral having a plurality of image processing functions including an image forming function, the multifunction peripheral including a holding part holding therein security criteria set for the image processing functions in one-to-one correspondence, the control method comprising steps of:
- a reception step of receiving, from an external terminal, a request for an access that is necessary for executing at least one of the image processing functions;
- an acquisition step of acquiring, from the external terminal, security information that is a security indicator regarding the access from the external terminal;
- a judgment step of judging whether or not one of the security criteria set for the at least one of the image processing functions is met, based on the acquired security information;
- an access control step of permitting the access, if the judgment step judges affirmatively, to permit the access, and if the judgment step judges negatively, to prohibit the access or permit the access with a limitation;
- an execution step executing the at least one of the image processing functions, if the access control step permits the access;
- wherein the acquired security information includes a result of a virus scan performed on the external terminal, the security criteria include information on a predetermined virus, and if the result of the virus scan indicates that the predetermined virus is detected in the external terminal, the judgment step judges negatively; and wherein
- the acquired security information further includes a most recent date of the virus scan of the external terminal,
- the security criteria include a longest permissible time period from a date of a last virus scan to a date of an execution of a corresponding one of the image processing functions, and
- the judgment step judges whether or not the longest permissible time period has elapsed since the most recent date.

19. A control method of a multifunction peripheral having a plurality of image processing functions including an image forming function, the multifunction peripheral including a holding part holding therein security criteria set for the image processing functions in one-to-one correspondence, the control method comprising steps of:
- a reception step of receiving from an external terminal, a request for an access that is necessary for executing at least one of the image processing functions;
- an acquisition step of acquiring, from the external terminal, security information that is a security indicator regarding the access from the external terminal;
- a judgment step of judging whether or not one of the security criteria set for the at least one of the image processing functions is met, based on the acquired security information;
- an access control step of permitting the access, if the judgment step judges affirmatively, to permit the access, and if the judgment step judges negatively, to prohibit the access or permit the access with a limitation;
- an execution step executing the at least one of the image processing functions, if the access control step permits the access; and
- providing the multifunction peripheral with a hard disk drive, wherein
- one or more of the security criteria set for corresponding one or more of the image processing functions that requires an access to the hard disk drive are stricter than one or more of the security criteria set for corresponding one or more of the image processing functions that do not require the access to the hard disk drive.

20. A control method of a multifunction peripheral having a plurality of image processing functions including an image forming function, the multifunction peripheral including a holding part holding therein security criteria set for the image processing functions in one-to-one correspondence, the control method comprising steps of:
- a reception step of receiving, from an external terminal, a request for an access that is necessary for executing at least one of the image processing functions;
- an acquisition step of acquiring, from the external terminal, security information that is a security indicator regarding the access from the external terminal;
- a judgment step of judging whether or not one of the security criteria set for the at least one of the image processing functions is met, based on the acquired security information;
- an access control step of permitting the access, if the judgment step judges affirmatively, to permit the access, and if the judgment step judges negatively, to prohibit the access or permit the access with a limitation;
- an execution step executing the at least one of the image processing functions, if the access control step permits the access;
- wherein the acquisition step regularly acquires pieces of security information from external terminals regardless of whether the request for the access is received by the reception step, the external terminals including an external terminal that are expected to be accessed in a future and a currently connected external terminal, wherein the multifunction peripheral further comprises:
- a security information holding step holding therein each piece of the security information for a corresponding one of the external terminals; and
- a warning step operable to compare, for each of the external terminals, a newly acquired piece of the security information with a previously acquired piece of the security information held in the security information holding step, and if the newly acquired piece of the security information includes one or more changed items that have security problems, instructing a corresponding one of the external terminals to present a warning message that notifies of the changed items.

21. A non-transitory recording medium on which a control program of a multifunction peripheral having a plurality of image processing functions including an image forming function, the multifunction peripheral including a holding part holding therein security criteria set for the image processing functions in one-to-one correspondence, the control program causing the multifunction peripheral to perform processing of:
- a reception step of receiving from an external terminal, a request for an access that is necessary for executing at least one of the image processing functions;
- an acquisition step of acquiring, from the external terminal, security information that is a security indicator regarding the access from the external terminal;
- a judgment step of judging whether or not one of the security criteria set for the at least one of the image processing functions is met, based on the acquired security information;
- an access control step of permitting the access, if the judgment step judges affirmatively, to permit the access, and if the judgment step judges negatively, to prohibit the access or permit the access with a limitation;
- an execution step executing the at least one of the image processing functions, if the access control step permits the access; and
- providing the multifunction peripheral with a hard disk drive, wherein
- one or more of the security criteria set for corresponding one or more of the image processing functions that requires an access to the hard disk drive are stricter than one or more of the security criteria set for corresponding one or more of the image processing functions that do not require the access to the hard disk drive.

22. A non-transitory recording medium on which a control program of a multifunction peripheral having a plurality of image processing functions including an image forming function, the multifunction peripheral including a holding part holding therein security criteria set for the image processing functions in one-to-one correspondence, the control program causing the multifunction peripheral to perform processing of:
- a reception step of receiving from an external terminal, a request for an access that is necessary for executing at least one of the image processing functions;
- an acquisition step of acquiring, from the external terminal, security information that is a security indicator regarding the access from the external terminal;
- a judgment step of judging whether or not one of the security criteria set for the at least one of the image processing functions is met, based on the acquired security information;
- an access control step of permitting the access, if the judgment step judges affirmatively, to permit the access, and if the judgment step judges negatively, to prohibit the access or permit the access with a limitation;
- an execution step executing the at least one of the image processing functions, if the access control step permits the access; and
- providing the multifunction peripheral with a hard disk drive, wherein
- one or more of the security criteria set for corresponding one or more of the image processing functions that requires an access to the hard disk drive are stricter than one or more of the security criteria set for corresponding one or more of the image processing functions that do not require the access to the hard disk drive.

23. A non-transitory recording medium on which a control program of a multifunction peripheral having a plurality of image processing functions including an image forming function, the multifunction peripheral including a holding part holding therein security criteria set for the image processing functions in one-to-one correspondence, the control program causing the multifunction peripheral to perform processing of:
- a reception step of receiving, from an external terminal, a request for an access that is necessary for executing at least one of the image processing functions;
- an acquisition step of acquiring, from the external terminal, security information that is a security indicator regarding the access from the external terminal;
- a judgment step of judging whether or not one of the security criteria set for the at least one of the image processing functions is met, based on the acquired security information;
- an access control step of permitting the access, if the judgment step judges affirmatively, to permit the access, and if the judgment step judges negatively, to prohibit the access or permit the access with a limitation;
an execution step executing the at least one of the image processing functions, if the access control step permits the access;
wherein the acquisition step regularly acquires pieces of security information from external terminals regardless of whether the request for the access is received by the reception step, the external terminals including an external terminal that are expected to be accessed in a future and a currently connected external terminal, wherein the multifunction peripheral further comprises:
a security information holding step holding therein each piece of the security information for a corresponding one of the external terminals; and
a warning step operable to compare, for each of the external terminals, a newly acquired piece of the security information with a previously acquired piece of the security information held in the security information holding step, and if the newly acquired piece of the security information includes one or more changed items that have security problems, instructing a corresponding one of the external terminals to present a warning message that notifies of the changed items.

* * * * *